(12) United States Patent
Amthor et al.

(10) Patent No.: US 12,190,616 B2
(45) Date of Patent: Jan. 7, 2025

(54) CELL COUNTING OR CELL CONFLUENCE WITH RESCALED INPUT IMAGES

(71) Applicant: Carl Zeiss Microscopy GmbH, Jena (DE)

(72) Inventors: Manuel Amthor, Jena (DE); Daniel Haase, Zöllnitz (DE); Michael Gögler, Wolfratshausen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 382 days.

(21) Appl. No.: 17/683,812

(22) Filed: Mar. 1, 2022

(65) Prior Publication Data

US 2022/0284719 A1 Sep. 8, 2022

(30) Foreign Application Priority Data

Mar. 2, 2021 (DE) .......................... 102021105020.0
Oct. 1, 2021 (EP) ..................................... 21200420

(51) Int. Cl.
*G06V 10/00* (2022.01)
*G06T 3/40* (2006.01)
*G06T 7/00* (2017.01)
*G06T 7/62* (2017.01)
*G06V 20/69* (2022.01)

(52) U.S. Cl.
CPC .............. *G06V 20/695* (2022.01); *G06T 3/40* (2013.01); *G06T 7/0012* (2013.01); *G06T 7/62* (2017.01); *G06T 2207/10056* (2013.01); *G06T 2207/20016* (2013.01); *G06T 2207/20081* (2013.01);

(Continued)

(58) Field of Classification Search
CPC ............ G06N 3/08; G06N 3/02; G06N 3/042; G06N 3/045; G06N 3/049; G06N 3/082; G06N 3/092; G06N 3/0454; G06N 3/0464; G06N 3/0475; G06N 20/00; G06N 20/10; G06N 20/20; G06T 7/002; G06T 7/62; G06T 7/0012; G06T 3/04; G06T 3/40; G06T 2207/20016; G06T 2207/20081; G06T 2207/20084; G06T 2207/30024; G06T 2207/30242; G06V 20/695

See application file for complete search history.

(56) References Cited

U.S. PATENT DOCUMENTS 6,599,741 B1 * 7/2003 Hecker ................ C12N 15/113
424/9.1
7,640,112 B2 * 12/2009 Tsipouras ........... G01N 21/6428
382/128

(Continued)

FOREIGN PATENT DOCUMENTS

DE 10160179 A1 7/2003
DE 102019220168 A1 6/2021

(Continued)

OTHER PUBLICATIONS

Partial European Search Report dated Mar. 25, 2022 from corresponding European Patent Appl. No. 21200420.4.

(Continued)

*Primary Examiner* — Amir Alavi
(74) *Attorney, Agent, or Firm* — KUSNER & JAFFE

(57) ABSTRACT

Various examples relate to determining a number and/or a confluency of cells in a microscopy image. To that end, the microscopy image is firstly rescaled and then processed.

22 Claims, 10 Drawing Sheets

(52) U.S. Cl.
CPC ............. *G06T 2207/30024* (2013.01); *G06T 2207/30242* (2013.01)

(56) References Cited

U.S. PATENT DOCUMENTS

| | | | | |
|---|---|---|---|---|
| 7,885,449 | B2* | 2/2011 | Tafas | G06V 20/698 424/9.6 |
| 8,077,958 | B2* | 12/2011 | Qian | G06V 20/695 382/128 |
| 11,400,119 | B2* | 8/2022 | Phan | C12N 5/0018 |
| 2008/0166035 | A1* | 7/2008 | Qian | G06V 20/698 382/133 |
| 2018/0312803 | A1* | 11/2018 | Banju | B01D 67/0062 |
| 2022/0284719 | A1* | 9/2022 | Amthor | G06T 3/40 |
| 2023/0105948 | A1* | 4/2023 | Amthor | G06V 10/267 382/133 |
| 2023/0108453 | A1* | 4/2023 | Amthor | G06T 7/0002 382/128 |
| 2023/0111345 | A1* | 4/2023 | Amthor | G06V 20/695 382/133 |

FOREIGN PATENT DOCUMENTS

| | | |
|---|---|---|
| EP | 3748574 A1 | 12/2020 |
| WO | WO2019/007632 A1 | 1/2019 |

OTHER PUBLICATIONS

Florian Kromp et al: "Deep Learning architectures for generalized immunofluorescence based nuclear image segmentation", arxiv.org, Cornell University Library, 201 Olin Library Cornell University Ithaca, NY 14853, Jul. 30, 2019 (Jul. 30, 2019).

Ko Byoungchul et al: "Image resizing using saliency strength map and seam carving for white blood cell analysis", Biomedical Engineering Online, Biomed Central Ltd, London, GB, vol. 9, No. 1, Sep. 20, 2010 (Sep. 20, 2010), p. 54.

Hollandi Reka et al: "nucleAIzer: A Parameter-free Deep Learning Framework for Nucleus Segmentation Using Image Style Transfer", Gell Systems, vol. 10, No. 5, May 1, 2020 (May 1, 2020), pp. 453-458.

Search Report (with English translation) dated Nov. 10, 2021 from related/corresponding German Patent Appl. No. 102021105020.0.

Extended European Search Report (with English translation) dated Jul. 18, 2022 from related/corresponding European Patent Appl. No. 21200420.4.

Jaccard, et al., "Automated method for the rapid and precise estimation of adherent cell culture characteristics from phase contrast microscopy images." *Biotechnology and Bioengineering*, vol. 111, No. 3, Mar. 3, 2014, pp. 504-517.

Baradez, et al., "The use of multidimensional image-based analysis to accurately monitor cell growth in 3D bioreactor culture." *PloS one* vol. 6, Issue 10, Oct. 2011, e26104, 8 pages.

Xue et al., "Cell counting by regression using convolutional neural network." 9913, pp. 274-290 (2016). DOI: 10.1007/978-3-319-46604-0 20.

Office Action (with English translation) dated Jul. 25, 2024 from related/corresponding European Patent Appl. No. 21200420.4.

* cited by examiner

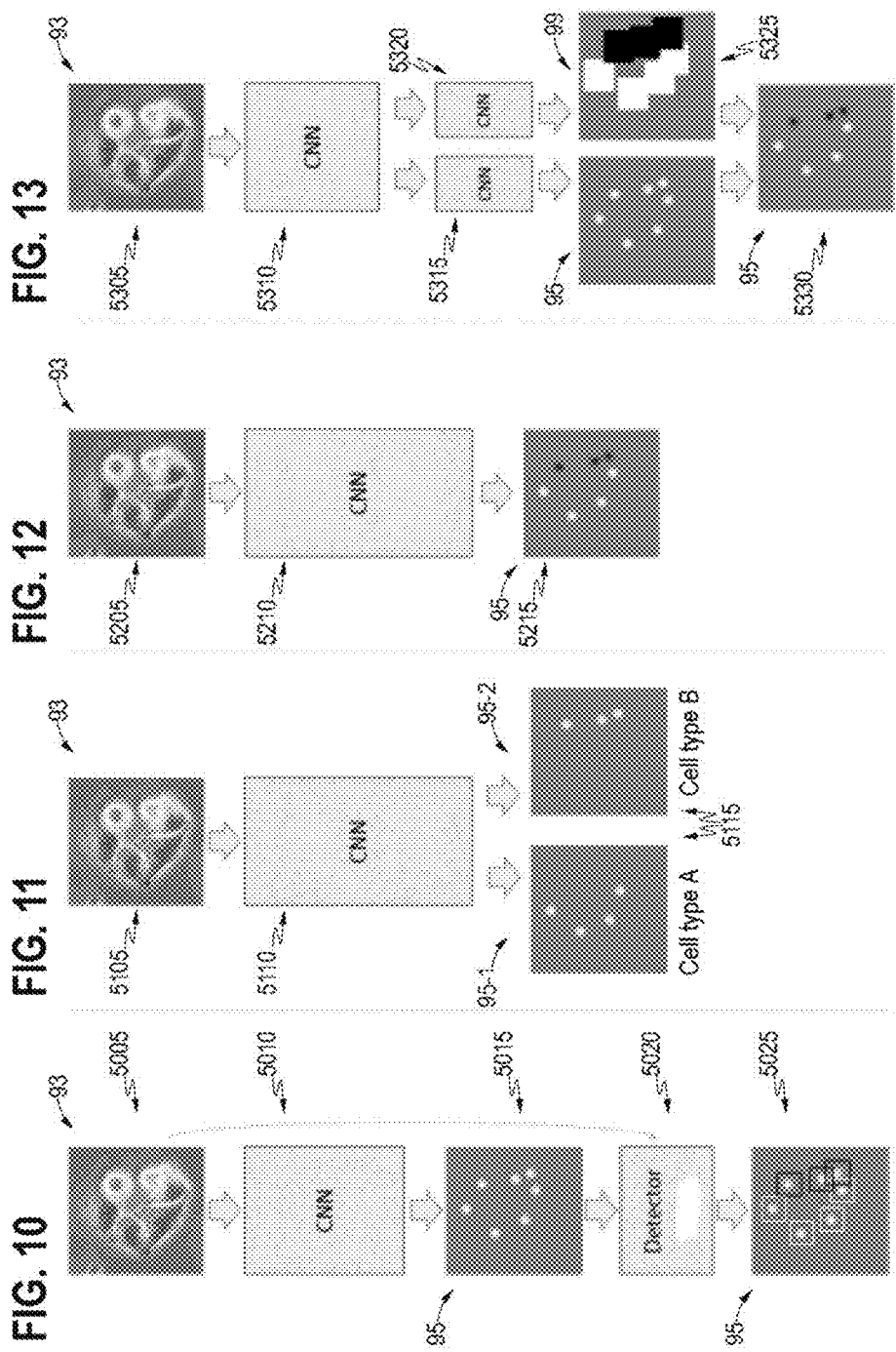

CELL COUNTING OR CELL CONFLUENCE WITH RESCALED INPUT IMAGES

TECHNICAL FIELD

Various examples of the invention relate to techniques for evaluating light-microscope images which image cells. For example, a number of cells and/or a confluency can be estimated.

BACKGROUND

In the examination of cell cultures, it is often necessary to quantify specific properties of the sample. By way of example, it may be necessary to determine an estimation of the number of cells or to determine an estimation of a confluency of the cells. In this case, the confluency denotes the proportion of the sample surface covered by cells.

An estimation of the confluency is often determined by simple optical estimation by a user on the basis of light-microscope images (microscopy images). Such an estimation is inaccurate. Moreover, it is difficult to quantify a change over time.

The number of cells can be determined for example in the field of view of the microscope or alternatively in the entire sample region. For this purpose, the number of cells can be counted manually by the user, which is complex, time-intensive and susceptible to errors.

Manual techniques for determining an estimation of the number and/or the confluency of the cells have certain disadvantages: for example, such a manual estimation can be comparatively time-intensive. That can sometimes be problematic because during a corresponding experiment, in reaction to a change in the number and/or the confluency of the cells, certain actions for interaction with the cell culture may be necessary.

Automated techniques for determining an estimation of the number and/or a confluency of the cells are also known. In that case, for example, a threshold value for the contrast of a light-microscope image can be determined and then for each image point the respective contrast can be compared with the threshold value in order to determine whether the respective image point images a cell or images background.

In the case of such threshold value-based techniques for determining the estimation of the number and/or the confluency of the cells, it is often necessary for parameter values of the corresponding evaluation algorithm to be suitably set by the user. Such parameterization of the evaluation algorithm may require expert knowledge and thus be susceptible to errors. Moreover, the analysis process is slowed down as a result.

SUMMARY

Therefore, there is a need for improved techniques for evaluating microscopy images which image cells concerning one or more observables associated with the cells.

This object is achieved by the features of the independent claims. The features of the dependent claims define embodiments.

A computer-implemented method comprises acquiring a light-microscope image. The latter images a multiplicity of cells. The method furthermore comprises adapting a size of the light-microscope image, such that a size of a predefined cell structure of the multiplicity of cells corresponds to a predefined reference value. Moreover, the method comprises determining an estimation of the number of cells on the basis of the light-microscope image; alternatively or additionally, the method comprises determining an estimation of a confluency of the cells.

A computer program or a computer program product or computer readable storage medium comprises program code. The program code can be loaded and executed by a processor. When the processor executes the program code, this has the effect that the processor carries out a method. The method comprises acquiring a light-microscope image. The latter images a multiplicity of cells. The method furthermore comprises adapting a size of the light-microscope image, such that a size of a predefined cell structure of the multiplicity of cells corresponds to a predefined reference value. Moreover, the method comprises determining an estimation of the number of cells on the basis of the light-microscope image; alternatively or additionally, the method comprises determining an estimation of a confluency of the cells.

A device comprises a processor. The processor is configured to acquire a light-microscope image. The light-microscope image images a multiplicity of cells. The processor is moreover configured to adapt a size of the light-microscope image, such that a size of a predefined cell structure of the multiplicity of cells corresponds to a predefined reference value. Furthermore, the processor is configured to determine an estimation of the number of cells on the basis of the light-microscope image. Alternatively or additionally, the processor is configured to determine an estimation of a confluency of the cells.

A computer-implemented method comprises acquiring a light-microscope image. The light-microscope image images a multiplicity of cells. Moreover, the method comprises determining an estimation of the number of cells and the confluency of the cells on the basis of the light-microscope image. The method furthermore comprises carrying out a cross-plausibilization of the estimation of the number of cells and the estimation of the confluency of the cells.

A computer program or a computer program product or computer readable storage medium comprises program code. The program code can be loaded and executed by a processor. When the processor executes the program code, this has the effect that the processor carries out a method. The method comprises acquiring a light-microscope image. The light-microscope image images a multiplicity of cells. Moreover, the method comprises determining an estimation of the number of cells and the confluency of the cells on the basis of the light-microscope image. The method furthermore comprises carrying out a cross-plausibilization of the estimation of the number of cells and the estimation of the confluency of the cells.

A device comprises a processor. The processor is configured to acquire a light-microscope image which images a multiplicity of cells. Moreover, the processor is configured to determine an estimation of the number of cells and of the confluency of the cells on the basis of the light-microscope image. Moreover, the processor is configured to carry out a cross-plausibilization of the estimation of the number of cells and the estimation of the confluency of the cells.

A computer-implemented method comprises acquiring a light-microscope image. The light-microscope image images a multiplicity of cells of a plurality of cell types. Moreover, the computer-implemented method comprises determining a plurality of density maps for the light-microscope image using a plurality of machine-learned processing paths of at least one machine-learned algorithm. In this case, the plurality of processing paths are assigned to the plurality of cell types. The plurality of density maps each encode a probability for the presence or the absence of cells of a corresponding cell type. The method furthermore comprises determining an estimation of a number of the respective cells and/or of a confluency of the respective cells on the basis of the plurality of density maps and for each of the plurality of cell types.

A computer program or a computer program product or computer readable storage medium comprises program code. The program code can be loaded and executed by a processor. When the processor executes the program code, this has the effect that the processor carries out a method. The method comprises acquiring a light-microscope image. The light-microscope image images a multiplicity of cells of a plurality of cell types. Moreover, the computer-implemented method comprises determining a plurality of density maps for the light-microscope image using a plurality of machine-learned processing paths of at least one machine-learned algorithm. In this case, the plurality of processing paths are assigned to the plurality of cell types. The plurality of density maps each encode a probability for the presence or the absence of cells of a corresponding cell type. The method furthermore comprises determining an estimation of a number of the respective cells and/or of a confluency of the respective cells on the basis of the plurality of density maps and for each of the plurality of cell types.

A device comprises a processor. The processor is configured to acquire a light-microscope image which images a multiplicity of cells of a plurality of cell types. Moreover, the processor is configured to determine a plurality of density maps for the light-microscope image using a plurality of machine-learned processing paths of at least one machine-learned algorithm. In this case, the plurality of processing paths are assigned to the plurality of cell types. The plurality of density maps each encode a probability for the presence or the absence of cells of a corresponding cell type. The processor is moreover configured to determine a corresponding estimation of a number and/or of a confluency of the respective cells on the basis of the plurality of density maps and for each of the plurality of cell types.

A computer-implemented method comprises acquiring a light-microscope image. The latter images a multiplicity of cells of a plurality of cell types. Moreover, the method comprises determining an aggregate density map for the light-microscope image using at least one machine-learned algorithm. The aggregate density map encodes for each cell type a probability for the presence or the absence of corresponding cells by way of a corresponding value range. Moreover, the method comprises determining an estimation of a number and/or a confluency of the respective cells on the basis of the aggregate density map for each of the plurality of cell types.

A computer program or a computer program product or computer readable storage medium comprises program code. The program code can be loaded and executed by a processor. When the processor executes the program code, this has the effect that the processor carries out a method. The method comprises acquiring a light-microscope image. The latter images a multiplicity of cells of a plurality of cell types. Moreover, the method comprises determining an aggregate density map for the light-microscope image using at least one machine-learned algorithm. The aggregate density map encodes for each cell type a probability for the presence or the absence of corresponding cells by way of a corresponding value range. Moreover, the method comprises determining an estimation of a number and/or a confluency of the respective cells on the basis of the aggregate density map for each of the plurality of cell types.

A device comprises a processor. The processor is configured to acquire a light-microscope image which images a multiplicity of cells of a plurality of cell types. Moreover, the processor is configured to determine an aggregate density map for the light-microscope image, using at least one machine-learned algorithm. The aggregate density map encodes for each cell type a probability for the presence or the absence of corresponding cells by way of a corresponding value range. Moreover, the processor is configured to determine an estimation of a number and/or of a confluency of the respective cells on the basis of the aggregate density map for each of the plurality of cell types.

A computer-implemented method comprises acquiring a light-microscope image which images a multiplicity of cells of a plurality of cell types. The method furthermore comprises determining a density map for the light-microscope image using a first machine-learned processing path, wherein the density map encodes a probability for the presence or the absence of cells independently of the cell type. Moreover, the method comprises determining the cell types for the cells of the multiplicity of cells on the basis of the light-microscope image using a second machine-learned processing path. The method furthermore comprises identifying the cell types in the density map; and, on the basis of the density map and the identifying and for each of the plurality of cell types, determining an estimation of a number and/or a confluency of the respective cells. A computer program or a computer program product or computer readable storage medium comprises program code. The program code can be loaded and executed by a processor. When the processor executes the program code, this has the effect that the processor carries out a method. The method comprises acquiring a light-microscope image which images a multiplicity of cells of a plurality of cell types. The method furthermore comprises determining a density map for the light-microscope image using a first machine-learned processing path, wherein the density map encodes a probability for the presence or the absence of cells independently of the cell type. Moreover, the method comprises determining the cell types for the cells of the multiplicity of cells on the basis of the light-microscope image using a second machine-learned processing path. The method furthermore comprises identifying the cell types in the density map; and, on the basis of the density map and the identifying and for each of the plurality of cell types, determining an estimation of a number and/or a confluency of the respective cells.

A device comprises a processor. The processor is configured to acquire a light-microscope image which images a multiplicity of cells of a plurality of cell types. Moreover, the processor is configured to determine a density map for the light-microscope image, using at least one machine-learned algorithm. Said density map encodes the probability for the presence or the absence of cells independently of the cell type. The processor is moreover configured to determine the cell types for the cells of the multiplicity of cells on the basis of the light-microscope image, specifically using a second machine-learned processing path. The processor is furthermore configured to identify the cell types in the density map. Moreover, the processor is configured to determine an estimation of a number and/or of a confluency of the respective cells on the basis of the density map and the identifying and for each of the plurality of cell types.

A computer-implemented method comprises acquiring a light-microscope image which images a multiplicity of cells of a plurality of cell types. Moreover, the computer-implemented method comprises determining a density map for the light-microscope image using at least one machine-learned algorithm. In this case, the density map encodes a probability for the presence or the absence of cells independently of the cell type. Moreover, the method comprises ascertaining positions of the cells on the basis of the density map and determining image excerpts of the light-microscope image on the basis of the positions of the cells. The method comprises, for each image excerpt, classifying the respective cell in order to determine the respective cell type and identifying the cell types in the density map. Moreover, the method comprises determining an estimation of a number and/or of a confluency of the respective cells, on the basis of the density map and the identifying, and for each of the plurality of cell types.

A computer program or a computer program product or computer readable storage medium comprises program code. The program code can be loaded and executed by a processor. When the processor executes the program code, this has the effect that the processor carries out a method. The method comprises acquiring a light-microscope image which images a multiplicity of cells of a plurality of cell types. Moreover, the computer-implemented method comprises determining a density map for the light-microscope image using at least one machine-learned algorithm. In this case, the density map encodes a probability for the presence or the absence of cells independently of the cell type. Moreover, the method comprises ascertaining positions of the cells on the basis of the density map and determining image excerpts of the light-microscope image on the basis of the positions of the cells. The method comprises, for each image excerpt, classifying the respective cell in order to determine the respective cell type and identifying the cell types in the density map. Moreover, the method comprises determining an estimation of a number and/or of a confluency of the respective cells, on the basis of the density map and the identifying, and for each of the plurality of cell types.

A device comprises a processor. The processor is configured to acquire a light-microscope image. The light-microscope image images a multiplicity of cells of a plurality of cell types. The processor is moreover configured to determine a density map for the light-microscope image, using at least one machine-learned algorithm. The density map encodes a probability for the presence or the absence of cells independently of the cell type. The processor is moreover configured to ascertain positions of the cells on the basis of the density map and to determine image excerpts of the light-microscope image on the basis of the positions of the cells. The processor is moreover configured to classify the respective cell for each image excerpt in order to determine the respective cell type. The processor is furthermore configured to identify the cell types in the density map and to determine an estimation of a number and/or of a confluency of the respective cells on the basis of the density map, the identifying and for each of the plurality of cell types.

A computer-implemented method comprises acquiring a light-microscope image with a plurality of channels. The plurality of channels each image a multiplicity of cells with a respective contrast. At least one reference channel of the plurality of channels comprises a respective fluorescence image which images the multiplicity of cells with a contrast which is specific to a respective fluorescent cell structure. The method furthermore comprises automatically determining a density map and/or a confluence map on the basis of the fluorescence images of the at least one reference channel. The density map encodes a probability for the presence or the absence of cells. The confluence map masks confluence regions. The method furthermore comprises training at least one machine-learned algorithm on the basis of a training channel of the plurality of channels as training input and the density map and/or the confluence map as ground truth.

A computer program or a computer program product or a computer-readable storage medium comprises program code. The program code can be loaded and executed by a processor. When the processor executes the program code, this has the effect that the processor carries out a method. The method comprises acquiring a light-microscope image with a plurality of channels. The plurality of channels each image a multiplicity of cells with a respective contrast. At least one reference channel of the plurality of channels comprises a respective fluorescence image which images the multiplicity of cells with a contrast which is specific to a respective fluorescent cell structure. The method furthermore comprises automatically determining a density map and/or a confluence map on the basis of the fluorescence images of the at least one reference channel. The density map encodes a probability for the presence or the absence of cells. The confluence map masks confluence regions. The method furthermore comprises training at least one machine-learned algorithm on the basis of a training channel of the plurality of channels as training input and the density map and/or the confluence map as ground truth.

A device comprises a processor. The processor is configured to acquire a light-microscope image with a plurality of channels. The plurality of channels each image a multiplicity of cells with a respective contrast. At least one reference channel of the plurality of channels comprises a respective fluorescence image which images the multiplicity of cells with a contrast which is specific to a respective fluorescent cell structure. The processor is furthermore configured to automatically determine a density map and/or a confluence map on the basis of the fluorescence images of the at least one reference channel, wherein the density map encodes a probability for the presence or the absence of cells. The confluence map masks confluence regions. The processor is configured to train at least one machine-learned algorithm on the basis of a training channel of the plurality of channels as training input and the density map and/or the confluence map as ground truth.

The features set out above and features that are described below can be used not only in the corresponding combinations explicitly set out, but also in further combinations or in isolation, without departing from the scope of protection of the present invention.

BRIEF DESCRIPTION OF THE FIGURES

FIG. 10 schematically illustrates exemplary data processing for determining a density map.

FIG. 11 schematically illustrates exemplary data processing for determining a density map.

FIG. 12 schematically illustrates exemplary data processing for determining a density map.

FIG. 13 schematically illustrates exemplary data processing for determining a density map.

DETAILED DESCRIPTION OF EMBODIMENTS

Figure 1:
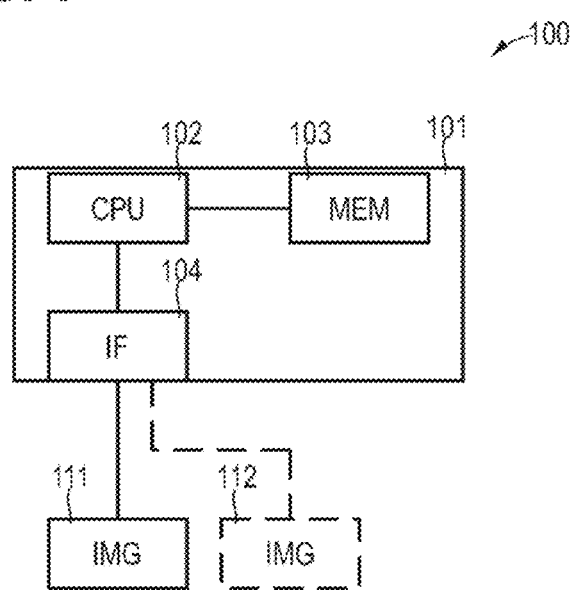
FIG. 1 schematically illustrates a device for data processing in association with the evaluation of microscopy images which image cells, in accordance with various examples.

The properties, features and advantages of this invention described above and the way in which they are achieved will become clearer and more clearly understood in association with the following description of the exemplary embodiments which are explained in greater detail in association with the drawings.

The present invention is explained in greater detail below on the basis of preferred embodiments with reference to the drawings. In the figures, identical reference signs denote identical or similar elements. The figures are schematic representations of various embodiments of the invention. Elements illustrated in the figures are not necessarily illustrated as true to scale. Rather, the various elements illustrated in the figures are rendered in such a way that their function and general purpose become comprehensible to the person skilled in the art. Connections and couplings between functional units and elements as illustrated in the figures can also be implemented as an indirect connection or coupling. A connection or coupling can be implemented in a wired or wireless manner. Functional units can be implemented as hardware, software or a combination of hardware and software.

Techniques for evaluating microscopy images which image a multiplicity of cells are described below. In accordance with the techniques described herein, cell cultures, for example, can be examined. Properties of the cells or cell cultures can be quantified.

By way of example, by means of the techniques described herein, it may be possible to determine an estimation of the number of cells. Alternatively or additionally, an estimation of the confluency—i.e. degree of coverage of the sample surface with cells—of the cells can also be determined.

In principle, such estimations can relate to a field of view of the light-microscope images or to the entire sample.

The techniques described herein make possible in particular a fully automated or at least partly automated evaluation. The techniques described herein make it possible to determine estimations with a high accuracy. Moreover, by means of the techniques described herein, it is possible to carry out the evaluation particularly computationally efficiently. What can thus be achieved, for example, is that the evaluation is carried out even on mobile devices, without a computer with special hardware being required. By way of example, it may be possible to carry out the evaluations described herein on an integrated chip in a light microscope ("on-device" implementation).

In some examples, it may happen that a light-microscope image images a plurality of cell types. Different cell types can be constituted for example by cells of different kinds, e.g. nerve cells vs. muscle cells. However, different cell types can also be constituted by cells of the same kind but in different life stages, for example living cells vs. dead cells. Different cell types can have different sizes.

Different cell types can also be associated with one another in a predefined hierarchy. For example, at a topmost hierarchical level of the predefined hierarchy, a distinction could be drawn between the cell types "normal" and "detached"; at the next lower hierarchical level, for the cell type "detached", a distinction can then be drawn between "dead" and "mitosis", or between different cell cycle stages for living cells; at the next lower hierarchical level, for "dead", a distinction can then be drawn between "necrosis" and "apoptosis". That is just one example and other cell types and other hierarchies are conceivable.

Adherent cell cultures grow on a substrate; suspension cells float in the aqueous medium. The cells multiply over time by means of cell division. However, they also die off. Apoptotic cells, already dead cells but also mitotic cells can often be differentiated only with great difficulty in the phase contrast. There are various markers or stains that allow the cell state to be differentiated. Here, there is e.g. trypan blue for distinguishing between living and dead cells, but also fluorescence markers that mark dead or apoptotic cells. Cells which are in the process of cell division or mitosis can likewise be identified by means of suitable markers.

Different cell types may be e.g.: detached vs. non-detached; living vs. dead; mitosis vs. apoptosis; different kinds of cells.

In accordance with the techniques described herein, it is possible, in principle, to carry out an evaluation for the different cell types. In particular, for example, selectively different quantitative estimations could be determined for the different cell types.

Various examples described herein are based on the use of one or more machine-learned (ML) algorithms for determining estimations in association with the cells. In the various examples, different types of ML algorithms can be used here. For example, artificial neural networks (ANNs) can be used here. An ANN comprises a multiplicity of layers which perform different operations. One example of an ANN is a convolutional neural network, which makes use of convolutional layers that carry out a convolution of input values with a kernel. The various layers can be connected to one another by way of suitable weights. Nonlinear activations are conceivable. Pooling operations can be carried out: information is discarded therein. One example is maxpooling, where only the strongest values of a region are retained (e.g. 2×2 neurons). ANNs can have a feedforward architecture. Here the result of one layer is only ever forwarded to a further layer. If so-called jump connections are present, the output of one layer can be forwarded to a plurality of subsequent layers. In principle, different types of ANNs can be used, e.g. in particular also generative adversarial networks (GANs) or autoencoder networks, e.g. variational autoencoder networks.

FIG. 1 schematically illustrates a system 100 in accordance with various examples. The system 100 comprises a device 101. The device 101 serves for evaluating microscopy images. The device 101 could be for example a computer or a server. The device 101 comprises a processor 102 and a memory 103. The device 101 also comprises an interface 104. Via the interface 104, the device 101 can receive image data, for example microscopy images, from one or more imaging devices 111, 112. The processor 102 could also transmit control data via the interface 104 to said one or more imaging devices 111, 112 in order to control the latter for capturing image data. By means of the control data, the processor 102 could also set the values of one or more imaging parameters, for example illumination parameters.

Put generally, the processor 102 can be configured to load control instructions from the memory 103 and to execute them. When the processor 102 loads and executes the control instructions, this has the effect that the processor 102 carries out techniques such as are described herein. Such techniques will include for example controlling the imaging device 111 and optionally the imaging device 112 in order to capture image data. For example, the processor 102 could be configured to control the imaging device 111 in order to capture a plurality of microscopy images of a sample by means of microscopic imaging during an observation period. The processor 102 can be configured to determine an estimation of a number and/or of a confluency of cells. The processor 102 can be configured to train an ML algorithm, on the basis of training data and labels denoting prior knowledge.

In principle, it is possible to use different imaging modalities for the microscopy images to be evaluated in the examples described herein. Said different imaging modalities can be implemented by one or more imaging devices such as the imaging devices 111, 112. Exemplary imaging modalities relate for example to transmitted light contrast (without fluorescence). For example, a phase contrast, in particular, could be used. A wide field contrast could be used. A bright field contrast could also be used. A further imaging modality provides a fluorescence contrast. For example, a fluorescence marker could be used in order to specifically stain certain cell structures. For example, the cell nucleus or the cell skeleton could be stained. Digital image contrasts are also conceivable as imaging modality. For example, a digital phase contrast could be generated by means of oblique illumination. It would be possible for the digital image contrast to be adapted depending on the desired evaluation. Sometimes it is possible for different contrasts also to be encoded as different channels of an image. One or more channels could then be selected for the subsequent evaluation. For example, different channels can be associated with different fluorescence wavelengths that identify different cell structures. One or more channels can then be selected for a specific evaluation task, such as, for example, determining the estimation of the number or determining the estimation of the confluency. If a plurality of images of different imaging modalities that have been registered to one another are available for a sample, it may be possible to automatically select that contrast which is particularly suitable for a subsequent evaluation. Optionally, it would also be possible to carry out the evaluation in parallel for the different contrasts and then to compare or fuse the results with one another.

Figure 2:
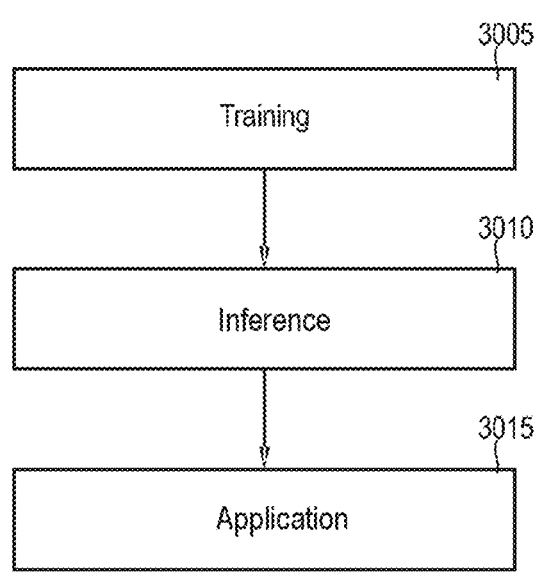
FIG. 2 is a flowchart of one exemplary method.

FIG. 2 is a flowchart of one exemplary method. For example, the method from FIG. 2 could be carried out at least partly by the processor 102 of the device 101.

FIG. 2 illustrates aspects in association with different phases of an evaluation of microscopy images.

Box 3005 involves training of one or more ML algorithms used for an evaluation or analysis of microscopy images, for example in order to determine an estimation of the number and/or of the confluency of the imaged cells. Parameter values of corresponding ML algorithms are thus determined in the context of the training.

This can be done by way of an iterative optimization that maximizes or minimizes a specific target function, taking account of training data—i.e. training microscopy images, which are assigned prior knowledge or ground truth in the form of labels. By way of example, techniques of backward propagation could be used in association with ANNs. A gradient descent method can be used here in order to set weights of the different layers of the ANNs.

The labels can be allocated manually by experts. However, it will also be conceivable for labels to be generated automatically. Additional image contrasts, in particular a fluorescence contrast, can be used for this purpose. Such additional image contrasts can be available exclusively during the training.

The training data can be extended by e.g. artefacts—such as scratches, dust, dirt—being simulated and superimposed on training microscopy images. The training data can be extended in order to achieve more accurate training. By way of example, artefacts could be added, such as, for example, bacterial or fungicidal infections of the cell culture. A robustness of the machine-learned evaluation algorithm can be provided in this way.

Different evaluation algorithms, for instance for determining the estimation of the number and the estimation of the confluency—can be trained jointly or separately.

In some examples, joint training with a loss function is conceivable, which loss function forces consistency between the estimation of the number and the estimation of the confluency. The loss function could e.g. penalize an absence of cells in a confluence region and/or reward a presence of a cell in a confluence region. The loss function could e.g. penalize a variance of a position space density of cells within confluence regions. That means, therefore, that it is possible to check whether the position space density of the cells, considered selectively within the confluence regions, varies as a function of position. If such a significant variation is present, that can be an indication that either the number of cells or the confluency or both has/have been estimated incorrectly.

One possible detailed implementation of box 3005 will be described later in association with FIG. 8.

After training has concluded, inference can then follow in box 3010, i.e. determining estimations without prior knowledge. In some examples, however, it would also be possible for the training to be carried out repeatedly, e.g. in a manner nested with the inference in box 3010. The one or more ANNs or other ML algorithms can be continuously improved as a result. For example, a user interaction via a human-machine interface could be implemented, which queries whether or not specific estimations are correct.

The application of the one or more ML algorithms trained in box 3005 then takes place in box 3010. That means that—without prior knowledge—estimations are determined for specific observables associated with the imaged cells. By way of example, an estimation of the number of cells and/or an estimation of the confluency of the cells can be determined on the basis of a light-microscope image.

In some examples, an estimation—for example number of cells and/or of the confluency—can be carried out in a manner resolved for different cell types. By way of example, dead and living cells could be counted separately. For example, it would be conceivable for detached and non-detached cells to be counted separately. It would be possible for cells in mitosis and cells in apoptosis to be counted separately.

The estimation in box 3010 can be supported by context information. The context information can be determined automatically or manually. Exemplary context information comprises: earlier estimations; user; cell type; imaging modality used; magnification factor of an objective lens of an imaging device; type of objective lens; camera or camera adapter; microscope settings.

For example, it would be conceivable for results of the estimation to be plausibilized on the basis of such additional information. Sudden abrupt changes in the estimation for the number and/or for the confluency without a change in the imaging modality or imaging parameters may be implausible, for example.

It would be possible for the user to be able to start and/or interrupt the evaluation via a human-machine interface (HMI)—typically a graphical user interface (GUI). An automatic termination of the evaluation could also be effected, for example if the estimations leave specific predefined ranges, for example because they are unreliable, or if a specific confidence level is attained.

In box 3015, an application can then optionally take place on the basis of the one or more estimations determined in box 3010. Some scenarios are set out below.

In one variant, the estimation of the number of cells and/or the estimation of the confluency are/is output to the user via an HMI. For example, such values can be displayed graphically, for instance together with the microscopy images. The microscopy images can be output in their original size, i.e. can be scaled back, or a copy could be kept without any scaling in the memory and then be output. The estimations could be displayed as superimpositions with the microscopy images in a GUI. For example, the cell midpoints and/or confluence regions could be superimposed on the microscopy image, for example with adjustable transparency. For example, an image sequence could be captured, for instance with a fixed image refresh rate. The estimation can then be determined repeatedly and be displayed in each case with the associated image of the image sequence. In particular, the estimation can thus be determined anew with the image refresh rate, that is to say e.g. in real time.

By way of example, it would be possible to check whether the number of cells lies above a specific threshold value. By way of example, it would be possible to check whether the number of cells in the image excerpt or in the entire sample lies above a specific threshold value. If the number of cells is too low—for example because the image excerpt has been chosen to be too small or because the sample comprises only a few cells—an automatic workflow could be initiated which causes further images to be acquired, for example at other positions and/or with other magnification factors.

Besides the estimation, for example, a confidence or reliability of the estimation could also be output. For example, a confidence level could be indicated in a spatially resolved manner; for example, it would be possible, in particular, to highlight such regions in the microscopy image for which the estimation of the number of cells and/or the estimation of the confluency are/is associated with a high inaccuracy.

The one or more estimations could be used in association with a workflow. For example, one or more actions of a microscopy measurement could be initiated depending on the estimation of the number and/or of the confluency of the cells. For example, a further image acquisition, for example with specific imaging parameters, could be initiated. If a specific confluency is exceeded or undershot, for example, then a light-microscope image could be captured in an automated manner. For this purpose, a corresponding imaging device could be controlled via a communication interface (cf. FIG. 1: Imaging devices 111, 112 and interface 104). Optionally, a warning could be output. Optionally, a measurement log could be extended by one entry.

The one or more estimations could be stored in metadata (e.g. header information) of the corresponding light-microscope images. As a general rule, in addition or as an alternative to the estimations of the number and/or of the confluency, other information can also be stored in the metadata of the images. For example, a magnification of an objective lens could be stored in the metadata. A type of the objective lens could be stored in the metadata. A type of an image capturing unit, for example of a camera or of a camera adapter, could be stored in the metadata. A type of the sample carrier could be stored in the metadata. Such data can be determined automatically or be queried manually, for example.

The one or more estimations could also be compared with earlier estimations. For example, a time profile of the estimation of the number of cells and/or of the estimation of the confluency could be determined in this way. By way of example, a rate of change could be ascertained.

The cell counting can be used for an estimation of the concentration of the cells. For example, it would be conceivable to determine an estimation for the total number of cells on the sample. For this purpose, for example, the density of the cells can be estimated and be multiplied by a known area of the sample as prior knowledge. The area of the sample can be ascertained from the geometry of the sample carrier. The sample carrier could be recognized automatically or be specified by the user. An application in association with a "Neubauer chamber" could also be carried out. For example, it would be possible to recognize automatically whether the cells are floating in a suspension. The use of Neubauer chambers may be dispensable if the results of the estimation of the number of cells are sufficiently accurate. The estimation of the number of cells can also be used to check what proportion of the cells still adhered on a sample carrier after a detachment step (for example using trypsin).

In various examples, it would be conceivable for a specific analysis operation to be initiated depending on the estimation of the number and/or of the confluency of the cells. Examples of such analysis operations comprise for example: longitudinal analysis (that is to say determination of changes over time); total number estimation (that is to say estimation of the number of cells in the entire sample region); cell cycle analysis (that is to say determination of phases of the cells in the cell cycle): cell growth analysis (that is to say determination of the change in size as a function of time). For example, that point in time at which the cells are expected to have finished growing or to be ready for transfer to a new sample could be ascertained. For example, a cell growth curve could be determined from a time series of the estimation of the confluency. A fitness indicator for the cell culture could be determined, for example. This could be based e.g. on a comparison of the estimation for the number with the estimation for the confluency for different cell types. If e.g. proportionally many dead cells are present, then the fitness may be low. If e.g. many cells in a specific cell stage are present, then the fitness may be low.

In some examples, the application in box 3015 can thus differentiate between different cell types. This is applicable particularly if the estimation of the number and/or of the confluency was determined separately for different cell types, e.g. living vs. dead cells, etc.

If information concerning different cell types is available, for example a statement about the state of the cell culture can be derived from a comparison of corresponding estimations for the different cell types. The state of the cell culture could also be ascertained in a manner temporally resolved over a specific period. Corresponding statistics could be output to the user.

If localization of cells, for example associated with different cell types, is available, further examinations can be carried out locally. For example, such cells that are in mitosis could be selected in a targeted manner.

Depending on the state of the cell culture, an automatic or semi-automatic workflow could be initiated. For example, a warning could be output to a user if a certain proportion of dead cells versus living cells is exceeded during a time series of captured microscopy images.

The number of living cells could be determined in a spatially resolved manner. That is to say that it would be possible to count the living cells over different areas of the sample in the degenerating state. This can be used as a basis for a dilution calculation during passaging.

Figure 3:
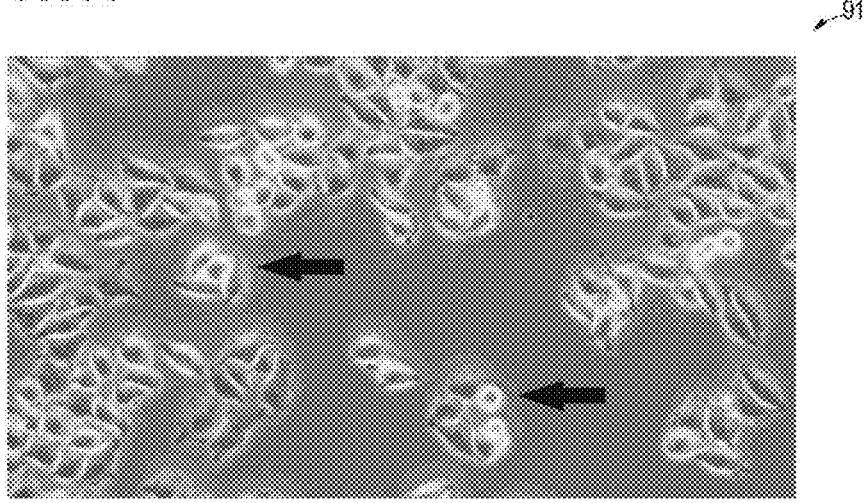
FIG. 3 is an exemplary microscopy image.

FIG. 3 illustrates an exemplary microscopy image 91. Cells are visible. In particular, cell types are visible, namely living cells and dead cells. The two types of cells are each marked by an arrow.

On the basis of such microscopy images such as the exemplary light-microscope image 91, an estimation for the number of cells and/or an estimation for the confluency can be determined, optionally separately for different cell types.

In principle, there are various options for determining the estimation for the number of cells and/or the estimation for the confluency. For example, a cell indicator representation that encodes the presence or the absence of cells could be used. Maps indicating the cell midpoints could be used. Detector result lists could be used.

In accordance with various examples, such an estimation for the number of cells and/or the estimation for the confluency can be determined in particular on the basis of a density map. Such a density map is illustrated for the microscopy image 91 from FIG. 3 in FIG. 4.

Figure 4:
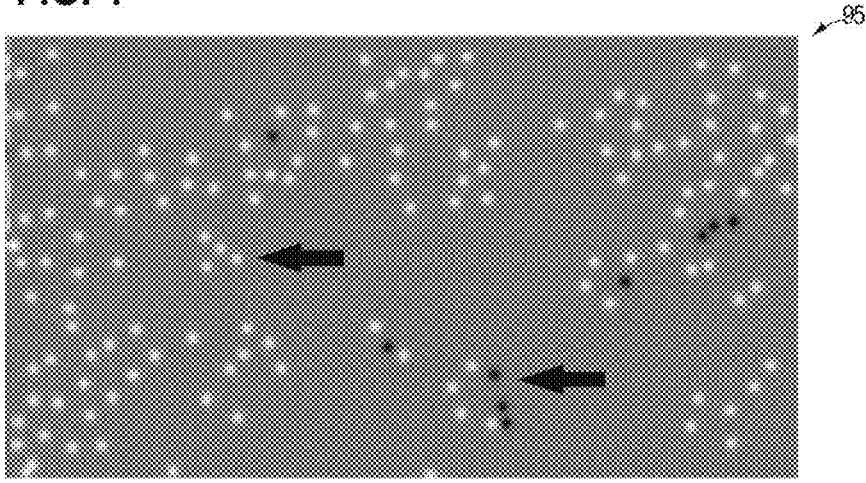
FIG. 4 is an exemplary density map which encodes the presence and absence of cells for the microscopy image from FIG. 3.

FIG. 4 schematically illustrates a density map 92. In the example in FIG. 4, the density map 92 is created for the light-microscope image 91 from FIG. 3. The density map identifies the probability for the presence or absence of a cell by way of the contrast. In the density map 92 in accordance with the example illustrated, for this purpose, a predefined density distribution is centered in each case at the position of the geometric cell midpoint. By way of example, Gaussian bell curves (Gaussian kernel) could be used as predefined density distributions. It is evident from FIG. 4 that a full width at half maximum of the Gaussian bell curves is significantly smaller than the typical diameter of the cells.

A local position space integral over each of the Gaussian bell curves for the living cells can yield e.g. a value of 1. What can be achieved as a result is that the position space integral over the entire density map 92 is equal to the number of cells. In any case the number of cells can be estimated on the basis of the position space integral.

In FIG. 4, it is evident that the predefined density distributions for the different cell types—namely the living cells and dead cells—of the microscopy image 91 have different value ranges (encoded with white and black). That is optional in principle.

Figure 5:
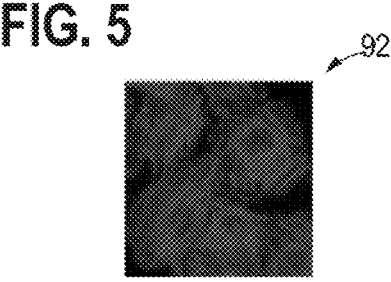
FIG. 5 is an exemplary microscopy image.

FIG. 5 is a further example of a microscopy image 92. The light-microscope image 92 was captured with fluorescence contrast as imaging modality in the example in FIG. 5.

Figure 6:
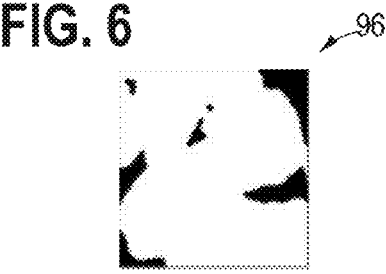
FIG. 6 is an exemplary confluence map which masks confluence regions for the microscopy image from FIG. 5.

FIG. 6 illustrates a confluence map 96, associated with the light-microscope image 92 from FIG. 5. The confluence map masks confluence regions (white contrast in FIG. 6), that is to say regions in which cells are arranged. The estimation of the confluency can be determined on the basis of the confluence map 96.

Figure 7:
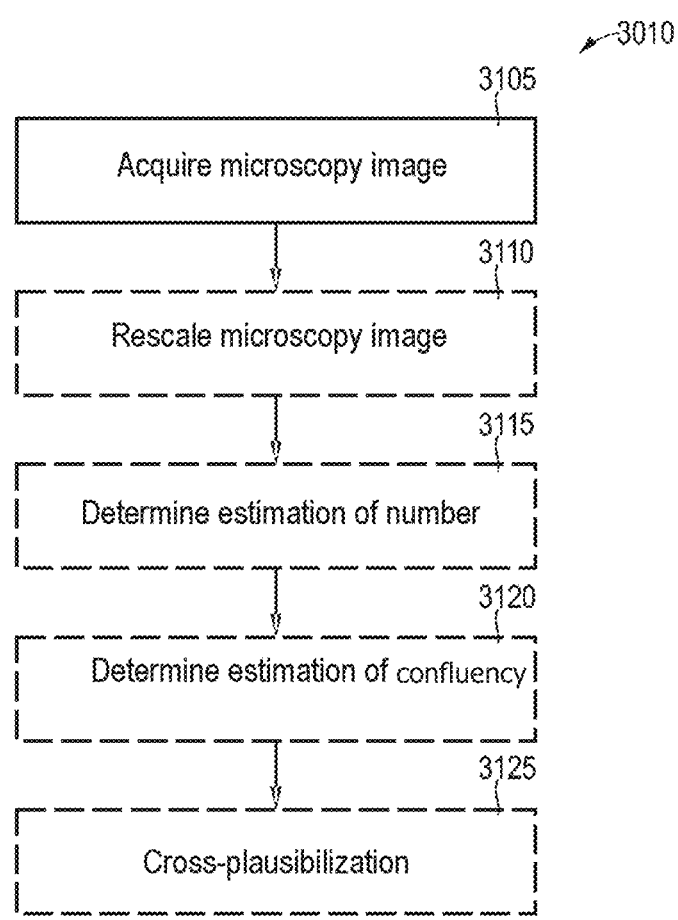
FIG. 7 is a flowchart of one exemplary method.

FIG. 7 is a flowchart of one exemplary method. FIG. 7 illustrates aspects with the digital evaluation of microscopy images for estimating the number and/or confluency of cells which are imaged by the microscopy images. By way of example, the method from FIG. 7 could be carried out by a data processing unit connected to a microscope for communication therewith. By way of example, the method from FIG. 7 could be carried out by the device 101, in particular by the processor 102 on the basis of program code which the processor 102 loads from the memory 103 and executes.

The method in FIG. 7 serves for evaluating a microscopy image, for instance as discussed in association with either of FIGS. 3 and 5. By means of the method in FIG. 7, in particular an estimation of the number of cells and/or an estimation of the confluency of the cells can be determined.

FIG. 7 can implement box 3010, for example.

In principle, it would be conceivable for the one or more estimation variables to be selected by the user. However, it would also be possible for the estimation of the number of cells and/or the estimation of the confluency of the cells to be optionally activated, for instance on the basis of an operating mode of a microscope used that captures the light-microscope image, or of an imaging modality used (the latter could be derived e.g. from meta-information in the microscopy image). For example, it would be conceivable that with the use of fluorescence contrast with marking of the cell nucleus as imaging modality, an estimation of the confluency is not necessary, and automatically exclusively the estimation of the number of cells is activated.

In principle, the activation of the estimation of the number of cells and/or the estimation of the confluency could be determined automatically on the basis of a predefined setting, such as cell type or imaging modality, for example.

A suitable estimation variable can also be selected on the basis of metadata. For example, metadata of the image or image capturing settings could be taken as a basis for selecting whether an estimation of the number of cells and/or an estimation of the confluency is carried out. It would also be possible, by means of a preprocessing algorithm, to carry out a coarse analysis of the image content and, on the basis of this upstream evaluation, to select either the evaluation algorithm for determining the estimation of the number of cells and/or for determining the confluency. Metadata could also be provided by way of a barcode. A user selection would be conceivable.

Different evaluation algorithms can be used in the various examples described herein. For example, threshold value-based evaluation algorithms with empirical parameterization can be used. ML evaluation algorithms could also be used. Evaluation algorithms that use a density map and/or a confluence map could be used.

If a plurality of evaluation algorithms are available for determining estimations, for example of the number of cells and/or of the confluency, independent estimations can be determined, using the different evaluation algorithms. These can then be fused.

Firstly, in box 3105, a microscopy image (typically a light microscopy image) which images a multiplicity of cells is acquired. This could comprise for example controlling an imaging device via a communication interface, such that the imaging device captures the image (cf. FIG. 1: Imaging devices 111, 112).

Capturing the image could for example be initiated actively by a user, for instance by clicking a corresponding button in a graphical user interface. Capturing the microscopy image could also be initiated automatically, for instance according to a predefined schedule. By way of example, image capturing could be initiated automatically, for instance if one or more imaging parameters are changed.

For example, automatic image capturing could be initiated if the field of view is changed, for instance because the sample holder is moved. Automatic image capturing could be initiated if the sample is changed; automatic image capturing could be initiated if an objective is changed.

For example, a number of images to be captured and/or positions of the sample stage for images to be captured could be defined depending on the sample carrier. By way of example, standardized sample carriers can be used, for example multiwell plates. In the case of such a procedure, the results of an evaluation algorithm for a specific position of the sample stage can be extrapolated to other sample regions.

By way of example, it would be conceivable for the microscopy image to be acquired in box 3105 after a further microscopy image has been deemed not to be usable; in particular, the microscopy image could be acquired in reaction to the unusability of the further microscopy image. In this case, there are in principle various criteria for determining the usability. By way of example, it would be possible to establish that a number of cells visible in the further microscopy image lies below a specific threshold value. That means that only comparatively few or no cells at all may be visible in the further microscopy image. The microscopy image could then be acquired as a reaction thereto in box 3105. For determining an estimation for the number of cells, the techniques described herein may be used, cf. for example FIG. 10 to FIG. 13. For example, the further microscopy image or the microscopy image could be captured at different positions on a sample. A sample stage of the microscope could thus be moved for the purpose of capturing the microscopy image.

However, a microscopy image could also be loaded from a database or be loaded from a memory.

Optionally, it would be conceivable for the quality of the microscopy image to be assessed. On the basis thereof, it is possible to determine whether the microscopy image is suitable for supporting subsequent analysis operations. That means that it is possible to check whether the microscopy image makes it possible to determine the estimation of the number of cells and/or the estimation of the confluency with a sufficient accuracy. If an insufficient quality is established, for example, the following options are available: by way of example, it is possible to completely omit the implementation of the subsequent boxes for analysis purposes. It would also be possible to carry out for example only the estimation of the number of cells, but not the estimation of the confluency, or vice versa. Alternatively or additionally, new image capturing can be initiated, for example with adapted image capturing parameters. It would also be possible to output a warning to the user or to ask the user about intended further action. The result of such an assessment of the image quality can be stored in the metadata of the image. The quality can be assessed e.g. by recognizing scratches or dirt. Suitable quality assessing algorithms can be used for this purpose. In principle, there are a variety of possibilities for assessing the image quality. By way of example, it would be possible to check whether an edge sharpness exceeds a specific threshold value. It is possible to check whether the sample is in focus or is arranged out of focus. It would also be possible to carry out a determination of cell types and it would then be possible to determine whether the desired analysis is suitable for these cell types. Alternatively or additionally, it would be possible to check whether noise, contamination, artefacts, etc. are present in the light-microscope image.

Acquiring a microscopy image in box 3105 can also comprise automatically selecting a suitable imaging contrast or a suitable imaging modality. By way of example, it would be conceivable to select a suitable contrast if a plurality of contrasts are present. For example, depending on the task, for example whether an estimation of the number or an estimation of the confluency or a specific application based thereon (cf. box 3015) is intended to be carried out, a different contrast can be selected. A corresponding look-up table could be provided. Generally, therefore, acquiring the light-microscope image can comprise selecting the light-microscope image from a multiplicity of light-microscope images with different contrasts.

Afterward, in box 3110, the size of the microscopy image from box 3105 can optionally be adapted. In particular, the size can be adapted such that the size of a specific predefined cell structure—for instance of the cell nucleus or of the average cell diameter—corresponds to a predefined reference value. This means that the microscopy image can be rescaled. A rescaled microscopy image is acquired, which can then be the basis for the subsequent boxes in FIG. 7.

In this case, there are in principle a variety of possibilities for adapting the size of the microscopy image in box 3110. For example, it would be conceivable to use a corresponding ML algorithm (rescaling algorithm) which adapts the size of the microscopy image by means of an image-to-image transformation on the basis of the light-microscope image. By way of example, a regression, classification or ordinal regression can be used. In such a scenario it is not necessary firstly to explicitly calculate a scaling factor and then to carry out downstream a magnification or a reduction depending on the scaling factor. Rather, the rescaling can be implemented automatically by means of suitable training of the rescaling algorithm. Afterward, by means of a comparison of the rescaled image with the original image, the scaling factor can then be ascertained if that is desired (e.g. in order to check a plausibility of the scaling factor). Such a rescaling algorithm could be implemented by an ANN, for example. The ANN can be trained for example by microscopy images being input as training images and a loss function subsequently being calculated, which takes account of a deviation of the size of the output of the ANN from a reference image that was manually rescaled by a user. The training of the ANN can then be effected on the basis of the value of the loss function.

In a further example, a machine-learned rescaling algorithm could be used to determine a scaling factor by means of an image-to-scalar transformation. The scaling factor can be output continuously with regression. As input, the rescaling algorithm can acquire the entire light-microscope image or image excerpts. If scaling factors are determined for a plurality of image excerpts, then these can subsequently be averaged; that means that an averaging in relation to the plurality of image excerpts takes place. Then, in a downstream algorithm, the size of the light-microscope image can be changed on the basis of the scaling factor. In the case of such an image-to-scalar rescaling algorithm, an explicit localization of cell structures is not necessary; rather, suitable features for determining the scaling factor are machine-learned. Such a rescaling algorithm could be implemented by an ANN, for example. The ANN can be trained for example by microscopy images being input as training images and a loss function subsequently being calculated, which takes account of a deviation of the output of the ANN from a reference scaling factor that was manually determined by a user. The training of the ANN can then be effected on the basis of the value of the loss function.

The use of an ANN for carrying out the rescaling is just one example, however. In another example, it would be conceivable for the cell structures for which the predefined reference value is present to be localized in the light-microscope image. For example, an object recognition algorithm can be used for this purpose. This algorithm could be based on heuristics. For example, it would be possible to find specific predefined contours, then to carry out an ellipse fit to the contours, and, on the basis thereof, to determine the radii of the ellipses—as the size of the cells. The predefined structure can then thus describe the cell diameter. Then, on the basis of this localizing, it is possible to determine the average size of the cell structure in the light-microscope image and to determine a scaling factor on the basis of the ratio of the average size and the predefined reference value. For example, the average size of the cell structure can be determined in each case for each of a plurality of image excerpts and then these values are averaged, i.e. the averaging is effected in relation to the image excerpts. The microscopy image can then be magnified or reduced on the basis of the scaling factor. Such a determination of the scaling factor can be carried out for example a number of times for a plurality of partial regions of the microscopy image. An average scaling factor could then be determined. This average scaling factor can be applied to the entire image.

Adapting the size of the microscopy image need not be effected in a single step. By way of example, it is possible to carry out an iterative adaptation with different rescaling step sizes. That means that iteratively in each case, for example, the size of the respective cell structure can be estimated and then a corresponding rescaling can be carried out. If it is established for example that the scaling factor is outside a predefined range, a coarse pre-scaling could take place followed by a more accurate scaling on the basis of the coarse pre-scaling.

Different scaling factors can be determined for different evaluation tasks. For example, a first instance of the rescaled image could be used for the determination of the estimation of the number of cells in box 3115 and a second instance of the rescaled image could be determined for the estimation of the confluency in box 3120.

In principle, it would be conceivable for a plurality of instances of the rescaled image to be determined in box 3110. In some examples, it is possible for the sample to comprise a plurality of cell types. In such an example, it is possible to determine a plurality of scaling factors for the different cell types. Put generally, it would be possible to determine a plurality of rescaled instances of the microscopy image, wherein the different rescaled instances have different scaling factors in relation to the original microscopy image. The different rescaled instances can be scaled here in each case in relation to the predefined cell structure of a corresponding cell type. By way of example, it would be possible to determine an associated instance of the microscopy image for each cell type and to adapt the size of the respective instance of the microscopy image such that the size of the predefined cell structure for the respective cell type corresponds to the predefined reference value. A respective rescaled instance of the microscopy image can then be acquired as a result. In this case, it would be conceivable for the number of instances or cell types to be predefined a priori; however, it would also be conceivable for the number of instances or cell types to be determined on the basis of the microscopy image.

The different types can be arranged in different partial regions of the microscopy image. By way of example, in different partial regions of the microscopy image the different types can be dominant, that is to say occur predominantly, in comparison with other types. The types can thus also be associated with the attendant partial regions of the image in which the respective type occurs or is dominant.

In this case, a variety of techniques can be used to determine partial regions of the image which are associated with a specific type. Some exemplary techniques are described below in association with TAB. 1.

TABLE 1

Various techniques for localizing cell types in a respective instance of the microscopy image or recognizing corresponding partial regions of the image.

| | |
|---|---|
| Object recognition | One or more partial regions of the image can be determined on the basis of object recognition. Cells of a specific cell type can be recognized in a targeted manner on the basis of characteristic features, e.g. shape.<br>The object recognition could use the appearances of the plurality of cell types as prior knowledge. For example, it would be conceivable for prior knowledge about the imaging size of different cell types to be available. For example, such prior knowledge could be acquired by means of a user input. It would also be conceivable for such prior knowledge to be determined, for example on the basis of properties of the imaging modality, for example on the basis of a magnification factor.<br>In other examples, it would also be conceivable, however, for the object recognition to predict the appearances of the plurality of cell types. Such a scenario can be helpful particularly if the number of different types is not fixedly predefined from the outset or remains open. |
| Image-to-image transformation | By way of example, a machine-learned algorithm could be applied to the microscopy image. This algorithm can output a scaling factor for the scaling continuously or discretely, for each pixel. This corresponds to image-to-image transformation. It would then be possible to smooth this scaling factor.<br>The different partial regions of the image then correspond to the regions in which the scaling factors assume different values. |
| Clustering algorithm | The one or more partial regions of the image can be determined using a clustering algorithm. The clustering algorithm can be trained by unsupervised learning. This algorithm can determine and localize the plurality of cell types on the basis of clusters of corresponding appearances. |

TABLE 1-continued

Various techniques for localizing cell types in a respective instance of the
microscopy image or recognizing corresponding partial regions of the image.

> By way of example, a machine-learned algorithm could be
> used. For example, a machine-learned encoding branch that
> encodes the microscopy image could be used. The clusters could
> then be determined on the basis of a spacing of latent feature
> representations. It would be possible to use latent feature
> representations of a CNN pixel- or patchwise, for example.
> The clusters can be determined for example on the basis of
> a segmentation, for instance of contrast values of the microscopy
> image.
> The clusters could also be determined on the basis of the
> output of an image-to-image transformation in accordance with the
> preceding example in this table. That means that clusters of a
> corresponding adaptation parameter that can be determined
> pixelwise can be ascertained.
> In some scenarios it would be conceivable for prior
> knowledge about the number of types reproduced in the
> microscopy image to be available. It would then be possible for the
> number of types to be predefined as a boundary condition of the
> clustering algorithm.
> By way of example, a k-means algorithm could be used if
> prior knowledge about the cell types in the microscopy image is
> available. Example: The permissible scaling factors are known. In
> such examples, the number of types is defined.
> However, it would also be possible for prior knowledge
> about the cell types not to be available. The number of clusters can
> then be determined dynamically. A latent Dirichlet allocation
> algorithm could be used.

A description is given below of an exemplary technique for determining a number of the cell types and optionally a localization of the cell types in the microscopy image. This exemplary implementation uses in particular a combination of the techniques from TAB. 1. For this purpose, a map describing the occurrence of the cell types in the microscopy image can be segmented. The map can thus indicate, for various image positions of the microscopy image, whether in each case a specific cell type appears there. The result of the segmentation can then indicate a plurality of partial regions in which a type appears, is dominant or is encountered exclusively.

A variety of techniques can be used here in order to determine such a map as input for the segmentation. In one variant, it would be possible to use an object recognition algorithm that marks concrete positions of the different cell types in the microscopy image, i.e. for example in each case the midpoint of a respective cell of the cell type. In this case, the object recognition algorithm could have recourse to prior knowledge concerning the appearance of the respective cell type in the microscopy image. For example, an imaging size of different cell types in the microscopy image could be concomitantly provided as prior knowledge (for instance on the basis of a known structure size and a known magnification factor of the imaging modality). For example, a geometric shape of the different cell types could be concomitantly provided as prior knowledge. However, such prior knowledge is not required in all variants. Sometimes, the object recognition algorithm could also itself ascertain the occurrence of different cell types, i.e. recognize a priori unknown classes or cell types. The object recognition algorithm could itself determine the imaging size of a cell type or the geometric shape in the microscopy image, for example. A further example for the determination of such a map would be the use of a clustering algorithm. The clustering algorithm can recognize the frequent occurrence of characteristic signatures without specific training, wherein said frequent occurrence can then be associated in each case with the presence of a specific cell type. On the basis of the clustering algorithm, the occurrence of a cell type can be determined in each case in position space and is then marked in the map. The clustering algorithm in turn can operate on a variety of inputs. For example, the clustering algorithm could use as input a scaling factor determined for the different pixels of the microscopy image or patchwise on the basis of an image-to-image transformation. Clusters can then be recognized in position space. The image-to-image transformation can then be carried out using a machine-learned algorithm. In this way, for example, a scaling factor could be predicted locally. Said scaling factor could vary from pixel to pixel, for example, and the clustering could then correspondingly identify in each case clusters of comparable scaling factors. A further example for an input into the clustering algorithm could be determined for example on the basis of the activities of an artificial neural network, i.e. could be acquired on the basis of the values of a latent feature vector of a machine-learned algorithm. In detail, an encoding branch could be used in order to encode in each case pixels or patches of the microscopy image. In this way, a latent feature vector is acquired for each pixel or patch. The different entries of the feature vector correspond to the probability of the occurrence of a respective type of the structure in the pixel or patch considered. For example, activities for a plurality of pixels or patches could then correspondingly be combined in order to form the map in this way. Yet another example for the input into the clustering algorithm concerns the use of a segmentation on the basis of contrast values. By way of example, segments of comparable contrast values of the microscopy image could in each case be determined. Foreground can be separated from background in this way. With the clustering algorithm, it would then be possible to search for clusters of comparable signatures in a targeted manner in the foreground region; however, it would also be possible already to form clusters directly in a structure-based manner without division into foreground and background (i.e. not to individually check each intensity value in the microscopy image, but rather for patches of the microscopy image on the basis of the structures). The last-mentioned variant would be advantageous if there is no background at all in the image, e.g. if the confluence of cells is 100%.

It is then possible for the estimation of the number and/or of the confluency of the cells to be determined on the basis of these rescaled instances of the microscopy image. The partial regions of the image which are associated with the different rescaled instances can be taken into account in this case.

Put generally, however, there is a variety of possibilities as to how the rescaled instances of the microscopy image can be taken into account. Some examples are listed in TAB. 2.

TABLE 2

Various possibilities for taking account of the partial regions of the image when determining the density map or confluence map.

| | Implementation | Exemplary details |
|---|---|---|
| I | Downstream discarding of non-relevant result components | By way of example, it would be conceivable for a plurality of density or confluence maps to be determined, specifically for each rescaled instance of the microscopy image. It is then possible to discard in each case such parts of a map which are associated with partial regions of the image which are different than the respectively assigned one or more partial regions of the image. That means, therefore, that parts of the density or confluence map which relate to partial regions of the image in which the respective cell type is not or not dominantly localized can be discarded. |
| II | Spatially resolved determination of the density map or confluence map. | Such partial regions of the image which are associated with the respective cell type can be selectively taken into account when determining the density map or confluence map. That means, therefore, that the maps of a specific cell type are determined from the outset only for relevant partial regions of the image. |
| III | Upstream masking | It would be conceivable, for example, for such partial regions of the image which are not associated with the respective cell type to be masked out for each rescaled instance of the microscopy image. What is achieved in this way is that the density map or the confluence map has no contributions which originate from partial regions of the image which are not associated with the respective cell type. |

For example, it would thus be conceivable for an assigned density map (cf. FIG. 4) to be determined for each rescaled instance of the microscopy image and then for the density maps assigned to the different rescaled instances to be combined with one another. The estimation of the number of cells can then be carried out on the basis of this combined/aggregate density map. Correspondingly—as an alternative or in addition to the density map—a confluence map could also be determined, for each rescaled instance. The associated confluence regions for the associated cell type can in each case be marked in the confluence map. These confluence maps can then be combined with one another. Individual partial estimations could in each case be effected as well. The (partial) estimation of the respective number and/or of the respective confluency can thus be effected for each rescaled instance. The results can then be combined with one another in order to acquire a combined estimation for all cell types. That means that the evaluations are carried out in each case a number of times for the different instances of the rescaled microscopy image (wherein e.g. such regions which image different cell types than the cell type crucial for the respective rescaling can be ignored in each case).

The differentiation between different cell types can be effected here on the basis of object recognition. For example, different cell types can have different shapes, for instance elliptic versus circular. With the use of a suitable contrast, for example a suitable fluorescence marker, different cell types can have different contrast levels in the light-microscope image.

There is a variety of possibilities for determining the instances. By way of example, copies of the entire light-microscope image could in each case be created. The size of these copies can then be adapted, in accordance with a respective scaling factor associated with a corresponding cell type. The subsequent evaluation can be effected selectively for such cells which are imaged with a specific size in the respective instance. It would also be conceivable for the instances to correspond to different partitions of the original light-microscope image. That means that in each case different partial regions or image excerpts of the light-microscope image can be scaled differently, depending on the cell type with which the corresponding partition is associated. For example, a partition could be associated in each case with the cell type occurring dominantly there or the cell type occurring in the majority there. By way of example, an unsupervised object recognition algorithm could be used in order to recognize and to localize cells of different cell types; the partitions could then be determined on the basis of the corresponding result. Such unsupervised object recognition could e.g. take account of characteristic features of the cells, e.g. the size.

A plausibilization of the scaling factor could optionally be carried out. If it is established, for example, that the scaling factor is outside a predefined range, a warning could be output to the user. It would also be conceivable, in the event of plausibilization having failed, to carry out a renewed iteration of the adaptation of the size of the light-microscope image. Alternatively or additionally, via a user interface it would be possible to query whether the scaling factor is acceptable. It would be possible to enquire about a scaling factor to be defined by the user. For example, it would be possible to determine a confidence level for the scaling factor. For example, the confidence level could be acquired as an output of a corresponding machine-learned algorithm. If the confidence level is too low, the plausibilization can fail. It would be possible to check, for example, whether the scaling factor is in a predefined range. For example it would be possible to check whether the scaling factor is not greater than a predefined upper threshold value and/or is not less than a predefined lower threshold value.

Subsequently, after the rescaling, the estimation of the number of cells can then be determined in box 3115 and/or the estimation of the confluency can be determined in box 3120 (beforehand it is optionally also possible for image edges to be removed or patches to be extracted).

As a general rule, it would be conceivable for box 3115 and box 3120 to be implemented by different algorithms. It would also be conceivable for box 3115 and box 3120 to be implemented by a common algorithm.

It would be conceivable for box 3110 and box 3115 and/or box 3120 to be implemented by a common algorithm. That means that the rescaling and subsequent evaluation in box 3115 and/or 3120 can be implemented in an integrated manner by an algorithm.

Optionally, this can be done separately for different cell types, e.g. on the basis of a plurality of instances of the rescaled microscopy image. However, the estimations could also be carried out cell type-agnostically, e.g. particularly if the plurality of rescaled instances of the microscopy image are fused.

By using a rescaling in box 3110, it is possible to reduce the complexity of an evaluation algorithm used in box 3115 and/or in box 3120. For example, an ML algorithm, for example an ANN, could also be used as evaluation algorithm. In such a case, the training of the evaluation algorithm (cf. FIG. 2: box 3005) can be restricted to training data which image the cells in such a way that the cell structure has a size in accordance with the predefined reference value. For example, a predefined reference value which corresponds to a comparatively small image size could be used. The size of the operators of the ML algorithm that are used can be reduced as a result. The number of computation operations can be reduced. As a result, a computationally efficient implementation on mobile devices, for instance on a processor of a light microscope, is also possible.

For example, for determining the estimation of the number of cells in box 3115, localization-free approaches could be used, that is to say that the number of cells is estimated directly on the basis of the images. This can be carried out by means of an ordinal regression or a patch-based prediction and aggregation. Such techniques are based on a global analysis of the input images. It is not necessary to resolve the position of individual cells. A corresponding exemplary technique is described in: Paul Cohen, Joseph, et al. "Countception: Counting by fully convolutional redundant counting." Proceedings of the IEEE International conference on computer vision workshops. 2017. A further technique is based on the prediction of the positions of the cell midpoints. Such techniques are described for example in principle in: Xie, Weidi, J. Alison Noble, and Andrew Zisserman. "Microscopy cell counting and detection with fully convolutional regression networks." Computer methods in biomechanics and biomedical engineering: Imaging & Visualization 6.3 (2018): 283-292. In this case, therefore, an ML algorithm, for instance an ANN, is used which provides a density map on the basis of the (e.g. rescaled) microscopy image. Said density map encodes the probability for the presence or absence of cells as a function of the position in the image. The number of cells can be determined on the basis of the density map. For example, a convolutional network can be used as the ANN. For example, a U-net architecture can be used, following Ronneberger, Olaf, Philipp Fischer, and Thomas Brox. "U-net: Convolutional networks for biomedical image segmentation." International Conference on Medical image computing and computer-assisted intervention. Springer, Cham, 2015. An image-to-image regression can be carried out. A predefined density distribution, for instance a 2-D Gaussian function, can be centered at each cell midpoint. In such a scenario, in particular, adapting the size of the microscopy image in box 3110 has the advantage that only a single cell size has to be covered by the corresponding model for creating the density map. The number of cells can then be determined by integration over the density map. The midpoints of the cells could be localized, on the basis of a threshold value approach and for example a suppression of local peaks that are close together. For example, a so-called non-maximum suppression (NMS) operation can be used. On account of the rescaled size of the image (box 3110), such filters can have a fixed parameterization.

In some examples, it would also be possible to acquire a plurality of density maps, each identifying the probability for the presence or absence of cells of a specific cell type. It would also be conceivable for a single density map to differentiate between two different cell types, e.g. by means of different value ranges or bounding boxes or by means of additional information. In such scenarios, an estimation of the number of cells can be carried out in a manner resolved for different cell types.

In principle, the estimation of the number of cells in box 3115 and the estimation of the confluency of the cells in box 3120 can be determined jointly by means of a common evaluation algorithm. However, it would also be possible to use separate evaluation algorithms for determining the estimation of the number of cells in box 3115 and for determining the confluency of the cells in box 3120.

There is a variety of possibilities for determining the estimation of the confluency in box 3120. For example a heuristic evaluation algorithm can be used for determining the estimation of the confluency. For example, contours of the cells can be found. By way of example, it is possible to carry out a threshold value analysis and then to find, in the mask acquired in this way, suitable contours in accordance with predefined reference shapes. These contours can designate the perimeter of the cells and thus describe confluence regions. A confluence map which masks the confluence regions can then be provided in this way. The estimation of the confluency can then in turn be determined on the basis of the confluence regions. However, such a confluence map could also be used on the basis of a machine-learned evaluation algorithm. For example, a convolutional neural network could be used in order to provide a binary segmentation for creating the masking of the confluence regions. A U-net architecture could again be used. A semantic segmentation could be carried out as a further approach for estimating the confluency. A binary masking of the confluence regions can again be carried out in this way. In this case, it is not necessary to carry out a separation of adjacent cells because counting of cells or delimitation of adjacent cells is not necessary for determining the confluency.

The confluency can also be estimated on the basis of a density map. For this purpose, e.g. a mean cell size can be assumed and be respectively assigned to each cell midpoint. The localization of the cell midpoints can be determined from the density map.

If a plurality of types of evaluation algorithms are available, the suitable evaluation algorithm could be selected automatically. There may be various selection criteria here. For example, the suitable evaluation algorithm could be selected depending on a type of experiment or depending on a type of sample. For example, the type of sample could be determined on the basis of an overview image or on the basis of a user input. This concerns not only the evaluation but for example also the selection of a suitable model for adapting an existing model with new recorded data, in the context of repeated training, cf. FIG. 2: Box 3005.

If the estimation of the number of cells is determined in box 3115 and also the estimation of the confluency of the cells is determined in box 3120, then a cross-plausibilization of the estimation of the number of cells and the estimation of the confluency can subsequently be carried out in box 3125. That means that it is possible to check whether the estimation of the number of cells is consistent with the estimation of the confluency, and/or vice versa. That means that the estimation of the number of cells or a variable derived therefrom or forming the basis can be compared with the estimation of the confluency or a variable derived therefrom or forming the basis. For example, the cross-plausibilization in box 3125 could comprise a check as to whether a cell is in each case arranged in a confluence region. By way of example, it is possible to check whether a cell midpoint or a specific cell structure, for instance the cell nucleus, is in each case arranged in a confluence region. The cell midpoint can be ascertained (as local maximum) from a density map as described herein. Alternatively or additionally, the cross-plausibilization could also comprise a determination of a variance of a position space density of cells within confluence regions. That means, therefore, that it is possible to check whether the position space density of the cells, considered selectively within the confluence regions, varies as a function of position. It is thus possible to check criteria such as: Does each predicted confluence region contain approximately the same number of cell midpoints per unit area, i.e. is the predicted cell density comparable for all predicted confluence regions; and/or are there points within a confluence region which are conspicuously far away from a cell midpoint prediction (more than ~3× cell diameter)? If such a significant variation is present, that can be an indication that either the number of cells or the confluency or both was/were estimated incorrectly.

As an alternative or in addition to the variance of the position space density, the absolute value of the position space density of the cells within the confluence regions could also be taken into account.

Besides such an explicit cross-plausibilization in box 3125, it would also be conceivable for the analysis algorithms used for the determination of the estimation of the number in box 3115 and the determination of the estimation of the confluency in box 3120 to be trained jointly, such that the results are crosswise plausible or consistent. That means that the consistency can be constrained in the training and is then implicitly present for the inference. The training takes place in box 3005, cf. FIG. 2. Details in this respect will be described in association with box 3520 in FIG. 8.

Box 3110 to box 3125 have a real-time capability. That means that a latency between acquiring the image in box 3105 and carrying out the subsequent process steps can be particularly short, for instance shorter than half a second or shorter than 100 ms.

Figure 8:
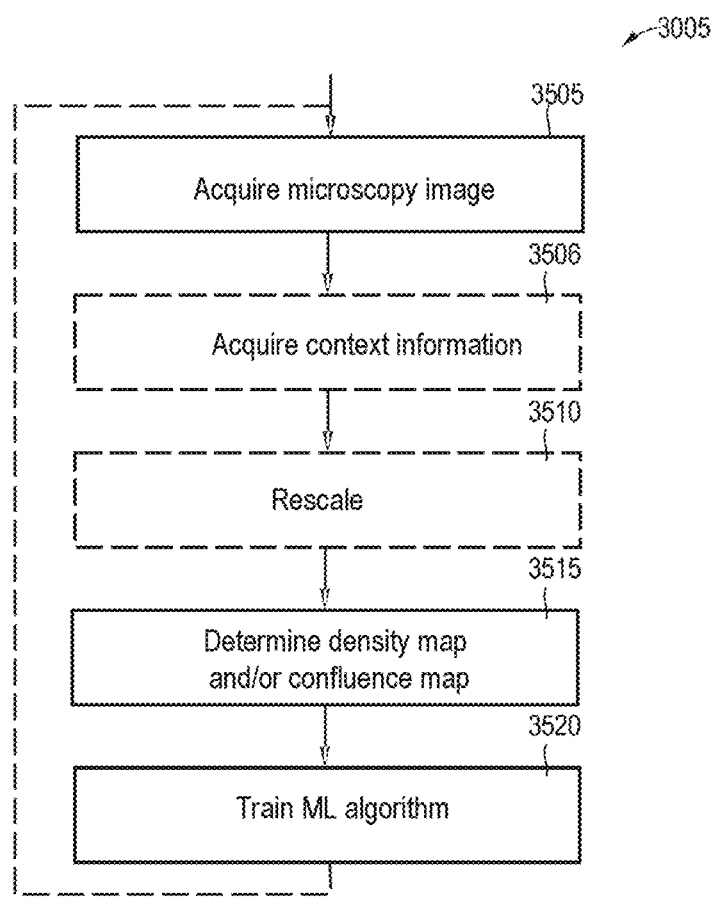
FIG. 8 is a flowchart of one exemplary method.

FIG. 8 is a flowchart of one exemplary method. FIG. 8 illustrates aspects in association with the training of evaluation algorithms for evaluating microscopy images. The evaluation can be used for the estimation of the number and/or of the confluency of the cells that are imaged by the microscopy images. By way of example, the method from FIG. 8 can be carried out by a data processing unit that is connected to a microscope or some other imaging unit for communication therewith. By way of example, the method from FIG. 8 could be carried out by the device 101, in particular by the processor 102 on the basis of program code which the processor 102 loads from the memory 103 and executes.

The method from FIG. 8 is an exemplary implementation of box 3005.

The method from FIG. 8 is based on the insight that generating labels that are then used for training ML algorithms can be laborious. Labels are often generated by manual annotation. That is time-consuming and sometimes subjective. This can become very laborious precisely in the case of cell counting and confluence measurement of microscopy images that were recorded using transmitted light with e.g. phase contrast. A solution for training in accordance with FIG. 8 is provided, therefore, which makes manual annotation superfluous to the greatest possible extent and leads to objective results. Automated training is possible.

With the suitable combination of transmitted-light and fluorescence contrasts for training, reliable training of evaluation algorithms can be carried out. For this purpose, for example, use is made of a fluorescence marker that stains the cell nuclei (e.g. DAPI, Hoechst, PI) and a further marker that reflects the cell extent (area) or cell boundary. This is possible e.g. by way of staining the plasma membrane. In this way, it is possible to generate training data for the counting of cells and the determination of the confluency from phase contrast images automatically and without manual annotations. In particular, automated training is possible.

Box 3505 involves acquiring the microscopy image. The latter comprises a plurality of channels. The different channels each image a multiplicity of cells with an associated contrast.

The different channels are registered to one another. That means that an assignment of image points exists. The registration could also be carried out optionally.

At least one reference channel of the plurality of channels serves for generating prior knowledge or labels and comprises a respective fluorescence image for this purpose. Such a fluorescence image images the multiplicity of cells with a contrast that is specific to a respective fluorescent cell structure. In this case, different reference channels can have different fluorescence contrasts. By way of example, a first reference channel could have a fluorescence contrast which involves the cell nucleus being marked. A second reference channel could have a fluorescence contrast which involves the cell skeleton being marked. Instead of being extracted from cell nucleus stainings (DAPI, Hoechst, . . . ), the information about cell midpoints can alternatively also be extracted from other stainings. Example: on the basis of cytoskeleton staining. In that case the cell nuclei are discernible as "holes" in the staining. For the confluence map, for example, it would be possible to use a fluorescence contrast that stains as follows: actin; microtubules (possibly forming convex hull); plasma staining; plasma membrane staining (possibly filling the segments that arise in the direction of the cell nucleus); or a combination thereof. Areal cell structures can thus be stained here.

The fluorescence channels need not exactly be in focus since typically only the "low-frequency" information is of interest during their processing (in the case of traditional algorithms, in general even explicit low-pass filtering is often effected).

If a plurality of reference channels are present, then the density map and the confluence map can be determined on the basis of different reference channels. The respective reference channel can be selected depending on a respective contrast. This can be done automatically.

The density map and/or the confluence map can be determined in each case on the basis of a plurality of fluorescence images, that is to say that a plurality of fluorescence images can be used jointly. Example: Use of cytoskeleton and cell membrane stainings (e.g. by forming the intersection set) in order to determine the confluence map even more robustly.

The channels also comprise a training channel. The latter differs from the one or more reference channels. It can be captured for example without fluorescence contrast, that is to say for example by means of phase contrast. However, it would also be possible for the training channel also to be captured with a fluorescence contrast. The training channel includes a training microscopy image. The corresponding imaging modality corresponds to the imaging modality available later during inference (box 3010) (whereas contrasts of the one or more reference channels are not available during inference).

There is a variety of implementation variants for acquiring the microscopy image in box 3505. By way of example, box 3505 could comprise controlling at least one imaging device for capturing a microscopy image or individual channels of the microscopy image. This could be initiated actively by the user, for example by pressing a button, for instance on a graphical user interface. An already existing, previously stored microscopy image could also be loaded. The user could manually load a microscopy image. A microscopy image could also be captured automatically. In this case, the capturing time can be predefined, for example at regular time intervals during an experiment, or can be defined adaptively. For example, the capturing could be initiated depending on an event.

It would be possible for the microscopy images to be preprocessed. For example, non-transfected cells could be found and corrected. Contamination, dirt or foreign bodies or other image disturbances can be recognized and, if appropriate, removed. Corresponding techniques are described in DE 10 2020 126 554 and DE 10 2021 114 351.

For example, cells at the image edge which are only partly visible could be removed. Geometric figures, for example ellipses, for the partly visible cells could also be filtered in order in this way to make it possible to determine the midpoint or the parameter for the confluence map.

Optionally, context information concerning the microscopy image from box 3505 can be acquired in box 3506. Exemplary context information comprises: earlier estimations; user; cell type; imaging modality used; magnification factor of an objective lens of an imaging device; type of objective lens; camera or camera adapter; microscope settings; prior knowledge concerning the geometry of the cells or concerning the appearance of the cells; prior knowledge about a spatial distribution of the cells; prior knowledge concerning a brightness distribution of cells.

The context information could e.g. be loaded from an image header of the microscopy image or be input by a user.

The context information can be taken into account when training the algorithm, e.g. when determining ground truth (box 3515) and/or as further training input (box 3520).

Optionally, the size of the microscopy image can then be adapted in box 3510. In particular, the size of the image can be adapted in such a way that the size of a predefined cell structure corresponds to a predefined reference value. Corresponding techniques have been described above in association with box 3110 from FIG. 7.

Subsequently, in box 3515, a density map and/or a confluence map are/is determined on the basis of one or more fluorescence images of the at least one reference channel. This can be done in an automated manner, that is to say that manual annotation/labelling is not required. Context information from box 3506 can be taken into account. For example, a combination of a plurality of reference channels can be used in order to determine the density map and/or the confluence map, which can be helpful e.g. if different reference channels have different fluorescence contrasts that identify complementary cell structures. Aspects in association with a density map 95 have already been described in association with FIG. 4. Aspects in association with a confluence map 96 have already been described in association with FIG. 6.

Subsequently, in box 3520, an evaluation algorithm can be trained on the basis of the density map and/or the confluence map as ground truth or label. The training channel serves as input for the training. The training input could also comprise context information, from box 3506.

A loss function can thus penalize a deviation between the output of the evaluation algorithm and the density map and/or the confluence map. By way of example, a pixelwise deviation could be considered.

If a plurality of ML processing paths of one or more ML algorithms which output first the density map and then the confluence map are trained in box 3520, a loss function that mixes both predictions can also be taken into account. A consistent estimation of number and confluency can be achieved as a result. For example, it would be conceivable for the estimation of the number of cells to take place using a first ML processing path and for the estimation of the confluency to take place using a second ML processing path. The first machine-learned processing path and the second ML processing path can be part of a single analysis algorithm or can be part of different analysis algorithms. The training of the first ML processing path and the training of the second ML processing path can be based on a loss function that penalizes the absence of cells in the confluence region and/or rewards the presence of cells in a confluence region. Alternatively or additionally, a loss function that penalizes a variance of the position space density of the cells within confluence regions could be taken into account.

There are various possibilities for determining the density map and/or the confluence map as prior knowledge in box 3515, on the basis of the one or more reference channels. By way of example, it would be possible for the density map and/or the confluence map to be created on the basis of a further ML algorithm that provides an image-to-image transformation from the respective fluorescence image of a reference channel to the density map and/or to the confluence map. Such techniques are based on the insight that determining a density map and/or confluence map on the basis of a fluorescence image can be carried out particularly robustly, in particular also for different cell types. This can be achieved by virtue of the deterministic character of the fluorescence contrast in relation to specific cell structures. It can therefore be possible to use a reliable ML algorithm for determining the density map and/or for determining the confluence map on the basis of a fluorescence contrast where this would not be possible, or would be possible only in a restricted way, for a simple phase contrast, for example.

Alternatively or additionally, it would also be possible to localize cell midpoints on the basis of the fluorescence images of the at least one reference channel. It would then be possible to center predefined density distributions at the cell midpoints, for example Gaussian density distributions with a predefined full width at half maximum. The sum of these density distributions then yields the density map.

Localizing cell midpoints can comprise for example applying a threshold value-based segmentation operation to the fluorescence images of the at least one reference channel in order to acquire a foreground mask in this way. One example of such a threshold value operation is an Otsu algorithm. Individual segments of the foreground mask can then be recognized. Said individual segments can each be associated with cells. The geometric midpoints of the individual segments can then be determined as cell midpoints.

Optionally, one or more morphological operations could be applied to the foreground mask. The morphology of the foreground mask can be modified in this way. For example, small holes can be closed, small islands can be removed, etc. Artefacts of the segmentation operation can be removed in this way.

Individual segments can be ascertained for example by means of contour finding or blob detection or ellipse fitting. The individual segments could also be filtered according to size and/or shape. Smoothing could be effective.

In particular, individual segments could be recognized on the basis of prior knowledge concerning geometry of the cells. The foreground mask could be filtered on the basis of such prior knowledge about the geometry of the cells.

Prior knowledge about a spatial distribution of the cells could also be taken into account. For example, it would be possible to check whether specific segments are arranged in accordance with the prior knowledge for the spatial distribution.

Alternatively or additionally, it would also be conceivable for prior knowledge about a brightness distribution of the cells to be taken into account. In this way, on the basis of pixel values, for example, it would be possible to check whether or not the segments image cells. Such and further prior knowledge can e.g. be determined on the basis of context information (cf. FIG. 8, box 3506) or be fixedly predefined.

In the case of cell division, two cell nuclei can be very close together. It has been observed that such an adjacent arrangement of cell nuclei can adversely affect an algorithm for localizing the cell midpoints. Therefore, such special cases can be recognized in a targeted manner. For instance, an analysis of the shape of the segments could be carried out: for example if segments having a significant deviation from an elliptic shape are present, then this can be rated as an indication of the presence of cell division, i.e. as a cell division event. A corresponding region could then be ignored and/or a user query could be initiated. It is also possible to fit a plurality of ellipses, for example by means of an optimization using an expectation maximization algorithm.

The confluence map can also be acquired for example by means of a threshold value-based segmentation operation, optionally after an upstream smoothing operation such as a low-pass filter, for example. Moreover, morphological operations and/or filters can be applied.

If, e.g. a cell structure is stained which spreads from the cell nucleus in the direction of the cell membrane (e.g. actin, microtubules), then a direction-dependent smoothing of the foreground mask can be effected, specifically in an orthogonal direction with respect to the structures.

As a result, the structures within the cell are smoothed, but the intensities are not carried beyond the cell membrane. As a result, the boundary of the confluence regions thus determined, under certain circumstances, lies even more exactly at the actual cell membrane.

Generally, context information can be used during the filtering of the foreground mask. By way of example, knowledge about the expected cell size (in pixels) could be used in order e.g. to adapt a smoothing operation (in particular size of the Gaussian kernel) thereto. Knowledge about type of cell or type of experiment can be used to preset parameters (e.g. filter size, threshold value, etc.). Knowledge concerning the (re-)identification of a user can be used to preset parameters such as in experiments that have already proceeded (possibly corrected by the user).

In principle, it would be conceivable for context information to be taken into account in the determination of the confluence map and/or the density map. For example, prior knowledge about the size and/or orientation could be dependent on the magnification factor. The expected grayscale value for specific structures could be derived from the prior knowledge.

Such and further prior knowledge can e.g. be determined on the basis of context information (cf. FIG. 8, box 3506) or be fixedly predefined.

Besides a determination of the confluence map and/or the density map, an instance segmentation of cells can also be effected. This is possible, for example, by the filtered foreground mask being used directly for generating an instance segmentation or being used as learning data for a machine learning model with respect to the instance segmentation model.

Optionally, the method can then be repeated, for further microscopy images. The latter can image e.g. cells of different cell types. The adaptation of the size in box 3510 can then use different scaling factors in each case, for microscopy images which image cells of different cell types with different sizes. What can be achieved in this way is that different cell types can be evaluated. By virtue of the optional rescaling, the evaluation algorithm can be trained robustly, even vis-à-vis changes in the imaging parameters and for cells of different sizes and of different cell types.

Cell midpoints of different cell types can be identified in a common density map and/or a plurality of density maps. A detailed description is given below of techniques which make it possible to determine the estimation for the number of cells and/or the confluency, wherein different cell types can be taken into account. That means that it is possible to determine different estimations for the different cell types. These techniques can be combined with non-fluorescence contrast imaging modalities, such as phase contrast. The quality check of cell cultures can be improved as a result since the "live cell viability" can be examined at every checking time. Living-dead assays or examinations of cell growth in reaction to chemical substances or compounds can be carried out in a simplified manner. A further advantage is that in cell culture the step of cell counting with a counting chamber (cells in suspension) can be saved since the same information is acquired by way of counting the adherent cells. The number of living cells is important for ascertaining a suitable dilution e.g. when passaging cells.

Figure 9:
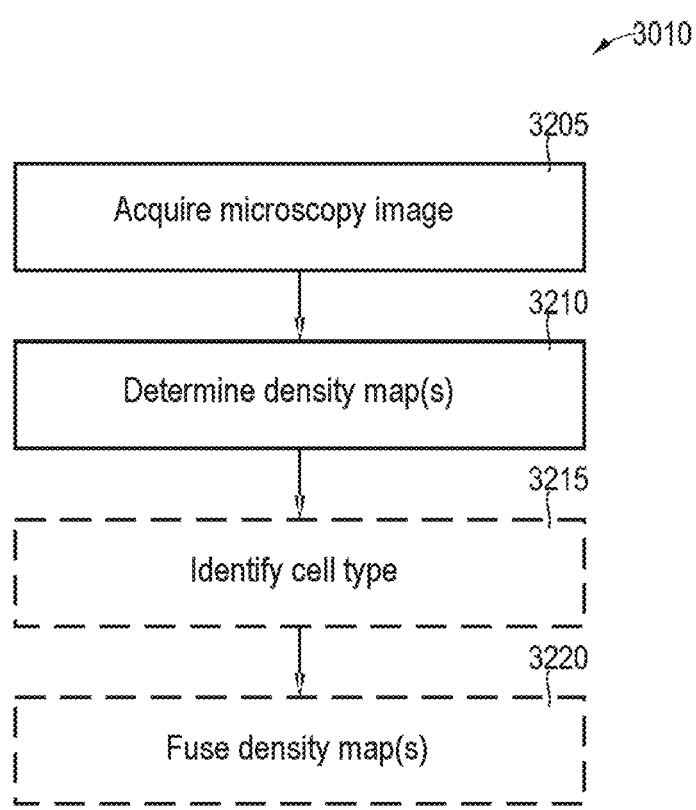
FIG. 9 is a flowchart of one exemplary method.

Details in association with a multi-class (for a plurality of cell types) density-based estimation of number and/or confluency are described in FIG. 9.

FIG. 9 is a flowchart of one exemplary method. FIG. 9 illustrates aspects in association with determining estimations of the number and/or of the confluency of cells of different cell types. By way of example, the method from FIG. 9 can be carried out by a data processing unit that is connected to a microscope for communication therewith. By way of example, the method from FIG. 9 could be carried out by the device 101, in particular by the processor 102 on the basis of programming code which the processor 102 loads from the memory 103 and executes.

The method in FIG. 9 is used for the inference (cf. FIG. 2: Box 3010) of the number and/or confluence of cells. This involves discriminating between different cell types. The method in FIG. 9 operates on the basis of one or more density maps. Aspects in association with a density map 95 have already been described in association with FIG. 4.

Such techniques are based on the insight that e.g. a "living-dead" differentiation can be important for the correct determination of the cell number, which then serves as a basis e.g. for dilution series. That means that an evaluation can be carried out selectively e.g. for living cells. Processing in accordance with FIG. 9 can proceed concomitantly during regular checks of the cell culture, thereby enabling an early recognition in the event of changes or irregularities. The need for separate cell counting by means of a counting chamber could become invalid.

A microscopy image is acquired in box 3205. Box 3205 corresponds to box 3105.

Acquiring the microscopy image in box 3205 can be implemented in a variety of ways. By way of example, in box 3205, it would be possible to control an imaging device for acquiring a microscopy image. That could be actively initiated by a user, for example by pressing a button, for instance in a GUI. An already existing, previously stored microscopy image could also be loaded. The user could manually load a microscopy image. A microscopy image could also be captured automatically. In this case, the capturing time can be predefined, for example at regular time intervals during an experiment, or can be defined adaptively. For example, the capturing could be initiated depending on an event.

The microscopy image can have a transmitted-light contrast without fluorescence encoding. By way of example, the microscopy image could have a phase contrast or a phase gradient contrast (for example digitally generated, by combination of images captured with different illumination directions), a bright field contrast, TIE, DIC, etc. However, the microscopy image could also have a fluorescence contrast, for example by way of a staining of cell nuclei.

In box 3210, one or more density maps are then determined on the basis of the microscopy image from box 3205. Optionally, the different cell types can subsequently be identified in a density map, in box 3215. In other examples, it would be possible for a plurality of density maps to be determined, in each case the different cell types. If a plurality of density maps are determined, they can optionally be fused in box 3220.

Put generally, box 3210 can thus be carried out in relation to a plurality of cell types. In principle, it would be conceivable for box 3210 to be implemented iteratively a number of times, namely for different cell types selected from a multiplicity of cell types on the basis of a predefined hierarchy between the cell types. For example, box 3210 could be carried out first for cells of the cell types "normal" and "detached", that is to say that a corresponding separation of density maps etc. as described above and explained in greater detail below could be carried out. Afterward, such cells which belong to the cell type "detached" could be differentiated further, for example with regard to cell types "dead" and "mitosis". The cell type "dead" can then be split up further into "necrosis" and "apoptosis". Results can be increasingly refined in this way, but in principle the same processing steps can be used for many hierarchical levels.

Details in association with the determination of one or more density maps are discussed below in association with FIG. 10, FIG. 11, FIG. 12 and FIG. 13. Those are all variants which can be implemented in association with boxes 3210, 3215 and 3220. The technical implementation of a multi-class density-based cell midpoint localization can take place in various ways. Four scenarios are explained below. A density-based cell midpoint localization can form a common basis here. In this case, an image-to-image model (or image regression model) generates, for each cell midpoint that is visible in the input image, a "small Gaussian bell" in the output image, the intensities of each small bell adding up to 1, for example. The additional differentiation between different cell types can already be integrated in this step or else take place subsequently or in parallel. Four different examples are explained below in association with FIG. 10 to FIG. 13.

FIG. 10 schematically illustrates the data processing for determining a density map which encodes a probability for the presence or absence of cells of different cell types. The scenario in FIG. 10 corresponds to a cell type-agnostic density-based localization of cells with subsequent patch classification of the different cell types.

Firstly, a microscopy image 93 is acquired in step 5005. Step 5005 thus corresponds to box 3205 from FIG. 9.

Step 5010 then involves determining a density map 95 for the microscopy image 93 using an ML algorithm. The density map 95 is then acquired as output, in step 5015. The density map 95 encodes the probability for the presence or absence of cells independently of the cell type, that is to say cell type-agnostically.

Step 5020 then involves ascertaining the positions of the cells in the density map 95, for example by means of a threshold value analysis or a non-maximum suppression evaluation. This makes it possible to avoid a further cell being localized in an area surrounding a cell.

In step 5020, it is then also possible to determine image excerpts on the basis of the ascertained positions of the cells, so-called patches. For each of these image excerpts, the cell can be classified, on the basis of the microscopy image. The respective cell type can be determined in this way. The cell types determined in this way are identified in the density map 95 in step 5025. On the basis of the density map 95 and this identifying, an estimation of the number and/or of the confluency can be carried out for each cell type.

An ML algorithm can be used for the classification in step 5020. Said algorithm can be suitably trained, on the basis of the image excerpts and manual annotation.

FIG. 11 schematically illustrates the data processing for determining two density maps 95-1, 95-2, each of which encodes the probability for the presence or absence of cells of a corresponding cell type. The scenario in FIG. 11 corresponds to a multi-class density-based localization of cells with separate channels for the different cell types.

Firstly, a microscopy image 93 is acquired in step 5105. Step 5105 thus corresponds to step 5005 from FIG. 10 or box 3205 from FIG. 9.

Step 5110 then involves determining a plurality of density maps 95-1, 95-2 using an ML algorithm. On the basis of said plurality of density maps 95-1, 95-2 acquired as output in step 5115, an estimation of the number and/or of the confluency of the respective cells can then be determined.

The two density maps 95-1, 95-2 could be compared with one another. In particular, it would be possible to ascertain whether a cell midpoint is localized at specific positions in both density maps 95-1, 95-2. This would indicate a processing error. In this way, a plausibilizing of the two density maps 95-1, 95-2 can thus be made possible by a spatially resolved comparison.

It would optionally be conceivable for the two density maps 95-1, 95-2 to be fused in order to acquire an aggregate density map in this way (cf. also FIG. 12 and FIG. 13), which encodes the presence or absence of cells of different cell types by means of different value ranges. The values of the different individual density maps 95-1, 95-2 could thus be mapped onto different value ranges of the aggregate density map. The estimation of the number and/or of the confluency of the cells can then be determined on the basis of the aggregate density map. This can afford the advantage of compact data processing.

In the scenario in FIG. 11, a single machine-learned algorithm is used in step 5110 for determining the density maps 95-1, 95-2. This ML algorithm comprises a plurality of processing paths assigned to the different cell types.

As a general rule there is a variety of possibilities for implementing different processing paths. By way of example, in one variant, it would be possible for the plurality of processing paths to have common encoding branches (which cause a contraction of feature vectors in position space toward a bottleneck with a latent representation of the input image) and decoding branches (which cause an expansion of feature vectors in position space away from the bottleneck), and only different output channels. That is to say that the processing can be different just in the last layer of an ANN. However, it would also be possible for the plurality of processing paths to have a common encoding branch and separate decoding branches—which can then comprise a plurality of layers. By way of example, there could be a different head for each processing branch. In some examples, it would even be conceivable to use completely separate ML algorithms for the different density maps 95-1, 95-2 (that is not illustrated in FIG. 11).

Generating separate density maps 95-1, 95-2 for the different cell classes makes it possible to avoid mutual influencing—for example as a result of superposition of different values which are arranged in value ranges associated with other cell types.

FIG. 12 schematically illustrates the data processing for determining a density map 95 which encodes the probability for the presence or absence of cells of a corresponding cell type. The scenario in FIG. 12 corresponds to a density-based localization of cells of a plurality of cell types with division of the value range of the density map 95 in accordance with the different cell types.

Firstly, a microscopy image 93 is acquired in step 5205. Step 5205 thus corresponds to steps 5105 and 5005 from FIG. 11 and FIG. 10, or box 3205 from FIG. 9.

Then by means of an ML algorithm in step 5210 an aggregate density map 95—which is acquired in step 5215—is determined.

The aggregate density map encodes for each cell type (two cell types are illustrated in FIG. 12) a probability for the presence or absence of corresponding cells by means of a corresponding value range. In the example in FIG. 12, the two value ranges are represented with white and black contrast in the aggregate density map 95 from step 5215.

On the basis of this aggregate density map, an estimation of the number and/or of the confluency of the respective cells can be determined for each of the plurality of cell types.

For example, living cells could be encoded with a density distribution in the value range [0,1], and/or inverse cells with respect thereto could be encoded with a density distribution in the value range [−1,0]. For a value of 0 this would mean that no cell is found there. These value ranges are merely examples. By way of example, value ranges for a first cell type of [0,0.5] and for a second cell type of [0.5,1] could also be used.

Such a variant has the advantage that the post-processing can take place particularly more compactly because only a single density map 95 is used.

FIG. 13 schematically illustrates the data processing for determining a density map 95 which encodes the probability for the presence or the absence of cells of a plurality of cell types through the use of a plurality of value ranges. The scenario in FIG. 13 thus corresponds to a density-based localization of cells of a plurality of cell types. In this case, the modeling of the cell type and of the cell presence is carried out separately.

Firstly, a microscopy image 93 is acquired in step 5305. Step 5305 thus corresponds in each case to steps 5005, 5105 and 5205 from FIGS. 10, 11 and 12, or box 3205 from FIG. 9.

Then, in steps 5310, 5315 and 5320, firstly a density map 95 is determined which encodes the probability for the presence or absence of cells independently of the cell type (i.e. a cell-like nature is output, without resolving the specific cell type); and secondly the cell types for the cells are determined on the basis of the microscopy image 93. For this purpose, two different ML processing paths are used, which can at least partly overlap. In the example in FIG. 13, a cell type map 99 is then acquired which encodes the respective cell type in each case at the cell positions.

The cell type map 99 could optionally be smoothed in position space.

It is then possible to identify the cell types in the density map, whereby an aggregate density map 95 is obtained which encodes both the positions and the cell types of the cells.

On the basis of this aggregate density map 95 in step 5021, an estimation of the number and/or of the confluency can be determined, corresponding to step 5215 from FIG. 12.

It is evident from FIG. 13 that the output of the ML algorithm in step 5315 provides the density map 95 in step 5325, which provides values for the density map which lie in the same value range for the plurality of cell types (in FIG. 13, all the cells are encoded with white contrast). For example, a corresponding ML processing path could have a layer that maps different activations of the ML processing path for the cells of the plurality of cell types onto this same value range. It would be possible to use an ReLU/sigmoid function that delimits the value range. This has the consequence that no density distributions with negative excursions can be generated. The processing path is thus constrained to predict positive density distributions independently of the respective cell type.

By contrast, the output of the ML processing path in step 5320 provides different discrete values for the plurality of cell types (in FIG. 13, these discrete values are respectively encoded with white color and black color). These different discrete values can serves as multipliers, the cell types in the density map 95 being identified by multiplication of the density map by the multipliers. However, other types of fusion would also be conceivable. Thus, the output of the processing path for the cell type map 99 is not intended to be able to predict continuous values (that is to say e.g. density distributions)—but rather discrete values that can serve e.g. as multipliers. The multipliers can have different signs but the same magnitude, e.g. +1, −1. This can be achieved by applying a corresponding function downstream of or as the output layer. This can be a tan h function or else a Heaviside function with a value range between [4,1]. The aim is to determine only the sign (i.e. the association with a class that correlates with the cell types), but not to model the density distribution. In the case of a Heaviside function, noise can be applied to the output values during the training of the ML processing path.

FIG. 13 shows a scenario in which two cell types are differentiated—e.g. living from dead cells. If there are a plurality of cell types, then the classification can also be effected hierarchically. For example first hierarchical level "normal" vs. "detached" and then split "detached" into "dead" vs. "mitosis" and then split up "dead" into "necrosis" vs. "apoptosis". Under certain circumstances, mitosis can also be separated into individual phases.

The desired outputs in the respective processing path in steps 5310, 5315, 5320 can be constrained by "deep supervision" during training. In this case, a loss function is introduced into the desired intermediate output. In concrete terms for the cell-like nature—i.e. the processing path in step 5315—this means that density maps are generated as prior knowledge (in box 3515 from FIG. 8), which show only positive density distributions (i.e. independently of the class). The loss between this density map and the output of the processing path can be calculated as in FIG. 10 and influence the optimization as an additional factor. Consequently, in the training, the processing path is explicitly constrained to generate an excursion for each cell midpoint class-independently. This implicitly means for the other processing path in step 5325 that only the sign "is left" for it.

FIG. 13 illustrates an example in which the two processing paths are partly separate. In principle, two completely separate ML algorithms can be used. However, it would also be possible to use an ML algorithm having partly separate processing paths, for example separate output layers and possibly decoding sections. It would also be possible to use a model with the sign as an attention mechanism (that is to say only one output layer and separation implicit owing to the design of the ML algorithm).

A particularly compact implementation of the processing paths can be made possible by means of the data processing in accordance with FIG. 13. Nevertheless, an unambiguous prediction can be obtained; superpositions such as in FIG. 12, for example, can be avoided. The density map 95 is agnostic regarding the cell type and can thus be trained jointly for different cell types. There is no need for a specific processing path for the localization of the cells. The complexity of the one or more ML algorithms can be reduced as a result. The run time can be reduced and the generalizability can be increased.

Figure 14:
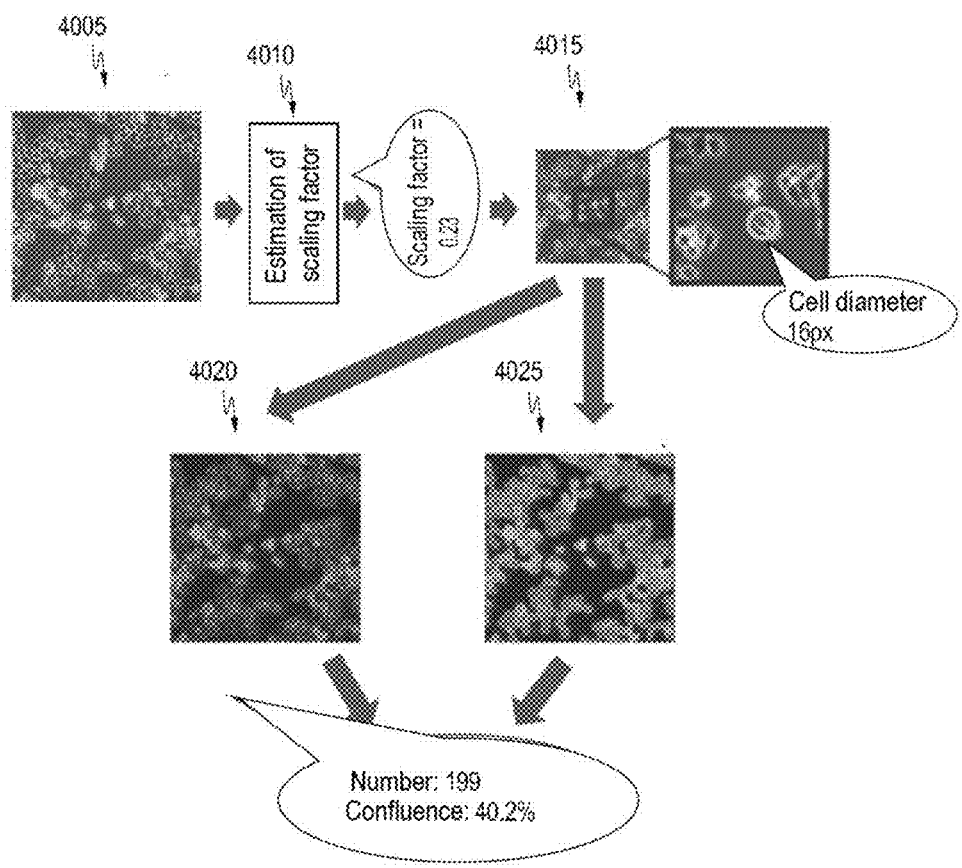
FIG. 14 schematically illustrates data processing for estimating the number of cells and the confluency in accordance with various examples.

FIG. 14 schematically illustrates the data processing for determining the estimation of a number of the cells and the estimation of a confluency on the basis of a microscopy image. FIG. 14 can implement for example the method from FIG. 7.

Firstly, a microscopy image is acquired in step 4005. Said microscopy image could have a phase contrast, for example.

In FIG. 14, cells are identified, wherein the cells have an average diameter which is not previously defined and which depends on the choice of objective, for example.

In step 4010, a scaling factor is then determined, which for example would be 0.23 in the example illustrated. That means that a rescaled microscopy image can be determined by adapting the size of the original microscopy image (reduction to approximately one quarter of the original size), which is acquired in step 4015. Corresponding techniques have been described above in association with box 3110. For example, an ML algorithm can be used or the average cell sizes or cell structure sizes—depending on what is used to effect normalization—could be measured by way of heuristics.

An estimation of the number of cells is subsequently determined in step 4020. In this case, in FIG. 14, a cell midpoint is in each case marked in the microscopy image (which is scaled back again to the original size). The cell midpoints can be ascertained for example from a density map (cf. density map 96 in FIG. 4), wherein the density map is used for determining the estimation of the number of cells. The density map can be determined for example by a suitable artificial neural network on the basis of the rescaled microscopy image. If a plurality of cell types are imaged, it is possible to use techniques in accordance with FIG. 9 to FIG. 13.

The estimation of the confluency is determined in step 4025. In this case, FIG. 14 illustrates how confluence regions can be superimposed on the microscopy image (scaled back again to its original size). The estimation of the confluency can be determined using a confluence map (cf. FIG. 6, where the confluence map 96 was discussed). The confluency could also be determined using a density map.

In step 4030, the estimation for the number of cells and the estimation for the confluency can be output, to a user.

Figure 15:
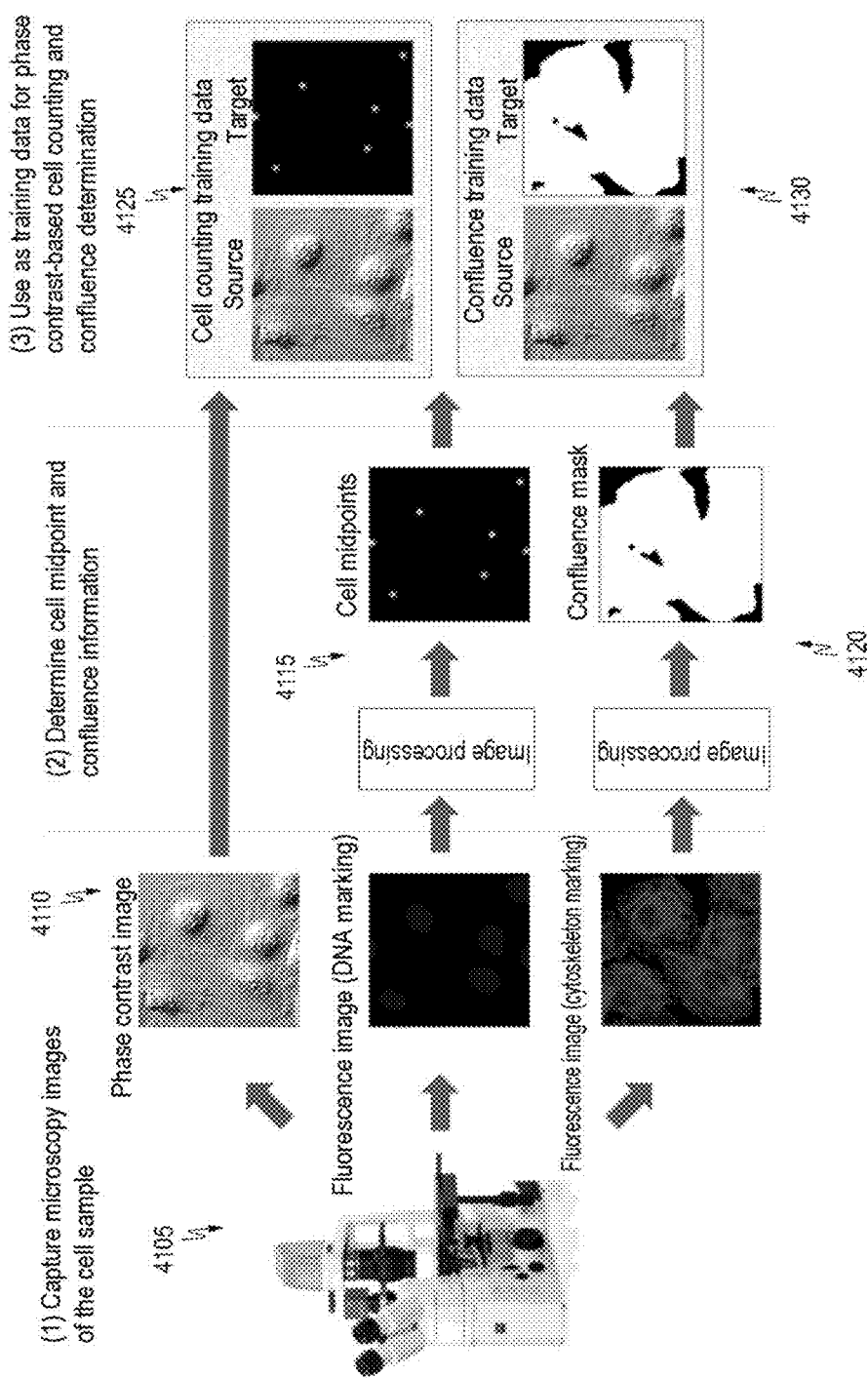
FIG. 15 schematically illustrates data processing for training an ML algorithm for estimating the number of cells in accordance with various examples.

FIG. 15 schematically illustrates the data processing for training a machine-learned algorithm that can be used to estimate the confluency and/or a number of cells. For example, it is possible to train ML evaluation algorithms that can be used in step 4020 and step 4025 in FIG. 14. The data processing in accordance with FIG. 15 can implement for example a method from FIG. 8.

Firstly, step 4105 involves capturing a microscopy image with a plurality of channels, which is acquired in step 4110. That corresponds to box 3505 from FIG. 8.

By way of example, in the scenario illustrated, a microscopy image with three channels is acquired, namely a phase contrast (right at the top), a fluorescence contrast that marks the DNA (in the middle), and a further fluorescence contrast that marks the cell skeleton (right at the bottom). The fluorescence contrasts are so-called reference channels because these are typically available only during training and are used for determining prior knowledge. As a general rule such fluorescence contrasts which highlight areal structures of cells can be suitable for the determination of a confluence map. Examples would be for example fluorescence contrasts which mark the cell skeleton or a cell membrane.

A phase contrast or a wide field contrast or a non-fluorescence contrast could generally be used for a training channel.

Step 4115 then involves determining prior knowledge in the form of a density map. For example, a further ML algorithm could be used for this purpose. A threshold value operation, for example followed by one or more morphological operations, could also be used. FIG. 15 illustrates that the prior knowledge in the form of the density map is determined on the basis of the fluorescence contrast that marks the DNA or the cell nucleus, that is to say is based on a corresponding reference channel of the microscopy image.

Moreover, step 4120 involves determining prior knowledge in the form of a confluence map. Once again an ML algorithm can be used for this purpose. A threshold value operation could also be used, for example followed by one or more morphological operations. FIG. 15 illustrates that the prior knowledge in the form of the confluence map is determined on the basis of the fluorescence contrast that marks the cell skeleton, that is to say is based on the basis of a corresponding reference channel of the microscopy image.

As a result, training data are acquired in each case in step 4125 and step 4130. The training data acquired in step 4125 comprise the phase contrast channel of the microscopy image from step 4110 as a training microscopy image and the density map from step 4115 as prior knowledge. The training data acquired in step 4130 in turn comprise the phase contrast channel of the microscopy image from step 4110 as a training microscopy image and the density map from step 4120 as prior knowledge.

Respective ML algorithms can then be trained, such that they predict a density map or respectively a confluence map. The size could be adapted beforehand, such that a specific cell structure has a size in accordance with a predefined reference value.

The training of ML processing paths and algorithms for determining the density map and the confluence map can be carried out in a coupled manner. It is possible to take account of a loss function which promotes consistent results (e.g. cell nuclei in confluence regions and low variance of the cell density within confluence regions).

In summary, at least the following examples have been described:

EXAMPLE 1. Computer-implemented method, comprising:
  acquiring (3105) a light-microscope image (91, 92) which images a multiplicity of cells,
  adapting (3110) a size of the light-microscope image (91, 92), such that a size of a predefined cell structure of the multiplicity of cells corresponds to a predefined reference value, and
  after adapting (3110) the size: determining (3115, 3120) an estimation of the number and/or a confluency of the cells on the basis of the light-microscope image (91, 92).

EXAMPLE 2. Computer-implemented method according to Example 1, furthermore comprising:
  using a first machine-learned algorithm, which adapts the size of the light-microscope image (91, 92) by means of an image-to-image transformation on the basis of the light-microscope image (91, 92).

EXAMPLE 3. Computer-implemented method according to Example 1, furthermore comprising:
  using a first machine-learned algorithm, which determines a scaling factor for adapting the size by means of an image-to-scalar transformation on the basis of the light-microscope image (91, 92).

EXAMPLE 4. Computer-implemented method according to example 3,
  wherein the first machine-learned algorithm acquires a plurality of image excerpts of the light-microscope image and wherein the scaling factor is determined on the basis of an averaging in relation to the plurality of image excerpts for the light-microscope image.

EXAMPLE 5. Computer-implemented method according to Example 1, furthermore comprising:
  localizing the cell structure in the light-microscope image (91, 92),
  of the basis of the localizing, determining an average size of the cell structure in the light-microscope image (91, 92), and
  determining a scaling factor for adapting the size on the basis of a ratio of the average size and the predefined reference value.

EXAMPLE 6. Computer-implemented method according to example 5,
  wherein localizing the cell structure and determining the average size are carried out for a plurality of image excerpts of the light-microscope image and the average size is determined on the basis of an averaging in relation to the plurality of image excerpts for the light-microscope image.

EXAMPLE 7. Computer-implemented method according to any of the preceding examples, furthermore comprising:
  carrying out a plausibilization of a scaling factor associated with adapting the size of the light-microscope image.

EXAMPLE 8. Computer-implemented method according to example 7,
  wherein the plausibilization is carried out depending on a confidence level of the scaling factor.

EXAMPLE 9. Computer-implemented method according to any of the preceding examples,
  wherein adapting the size of the light-microscope image is carried out in a plurality of iterations, EXAMPLE 10. Computer-implemented method according to example 9,
  wherein adapting the size of the light-microscope image is effected in the plurality of iterations until a plausibilization of a scaling factor associated with adapting the size of the light-microscope image is successful.

EXAMPLE 11. Computer-implemented method according to any of the preceding examples,
  wherein the multiplicity of cells has a plurality of cell types having different sizes, wherein adapting the size of the light-microscope image (91, 92) furthermore comprises:
  for each cell type: determining an associated instance of the light-microscope image (91, 92) and adapting the size of the respective instance of the light-microscope image (91, 92), such that the size of the predefined cell structure for the respective cell type corresponds to the predefined reference value, whereby a respective rescaled instance of the light-microscope image (91, 92) is acquired,
  wherein determining the estimation of the number and/or the confluency of the cells is carried out on the basis of the rescaled instances of the light-microscope image.

EXAMPLE 12. Computer-implemented method according to example 11, wherein the method furthermore comprises:
  the instances in each case correspond to partitions of the light-microscope image in which a corresponding cell type is dominant.

EXAMPLE 13. Computer-implemented method according to example 12,
  wherein an unsupervised object recognition algorithm is used in order to localize the cells of the plurality of cell types.

EXAMPLE 14. Computer-implemented method, comprising:
- acquiring (3105) a light-microscope image (91, 92) which images a multiplicity of cells,
- determining (3115, 3120) an estimation of the number of cells and an estimation of the confluency of the cells on the basis of the light-microscope image,
- carrying out (3125) a cross-plausibilization of the estimation of the number of cells and the estimation of the confluency of the cells.

EXAMPLE 15. Computer-implemented method according to example 14,
- wherein the cross-plausibilization comprises a check as to whether a cell is in each case arranged in a confluence region.

EXAMPLE 16. Computer-implemented method according to example 14 or 15,
- wherein the cross-plausibilization comprises a determination of an absolute value and/or a variance of a position space density of cells within confluence regions.

EXAMPLE 17. Computer-implemented method according to any one of the preceding examples,
- wherein the estimation of the number of cells is determined using a first machine-learned processing path of at least one second machine-learned algorithm,
- wherein the estimation of the confluency of the cells is determined using a second machine-learned processing path of the at least one second machine-learned algorithm,
- wherein a training of the first machine-learned processing path of the at least one second machine-learned algorithm and of the second machine-learned processing path of the at least one second machine-learned algorithm is based on a loss function which penalizes an absence of cells in a confluence region and/or which rewards a presence of a cell in a confluence region.

EXAMPLE 18. Computer-implemented method according to any of the preceding examples,
- wherein the estimation of the number of cells is determined using a first machine-learned processing path of at least one second machine-learned algorithm,
- wherein the estimation of the confluency of the cells is determined using a second machine-learned processing path of the at least one second machine-learned algorithm,
- wherein a training of the first machine-learned processing path of the at least one second machine-learned algorithm and of the second machine-learned processing path of the at least one second machine-learned algorithm is based on a loss function which penalizes a variance of a position space density of cells within confluence regions.

EXAMPLE 19. Computer-implemented method according to any of the preceding examples,
- wherein the estimation of the number of cells is determined using a second machine-learned algorithm,
- wherein the second machine-learned algorithm provides a density map (95) on the basis of the light-microscope image, wherein the density map (95) encodes a probability for the presence or absence of cells, wherein the number of cells is determined on the basis of the density map (95).

EXAMPLE 20. Computer-implemented method according to any of the preceding examples,
- wherein the estimation of the confluency of the cells is determined using a second machine-learned algorithm,
- wherein the second machine-learned algorithm provides a confluence map (96) on the basis of the light-microscope image (91, 92), wherein the confluence map (96) masks confluence regions, wherein the confluency is determined on the basis of the confluence map (96).

EXAMPLE 21. Computer-implemented method according to any of the preceding examples, wherein the method furthermore comprises:
- displaying the light-microscope image (91, 92) together with the estimation of the number and/or of the confluency of the cells and as part of an image sequence of a plurality of microscopic images.

EXAMPLE 22. Computer-implemented method according to any of the preceding examples, wherein the method furthermore comprises:
- displaying the light-microscope image (91, 92) in its original size before adapting the size.

EXAMPLE 23. Computer-implemented method according to any of the preceding examples, wherein the method furthermore comprises:
- optionally activating the estimation of the number of cells and/or the estimation of the confluency of the cells on the basis of at least one from an operating mode of an imaging device (111, 112) that captures the light-microscope image (91, 92), or an imaging modality of the light-microscope image (91, 92).

EXAMPLE 24. Computer-implemented method according to any of the preceding examples, wherein the method furthermore comprises:
- optionally initiating at least one action of a microscopy measurement depending on the estimation of the number and/or of the confluency of the cells.

EXAMPLE 25. Computer-implemented method according to example 24,
- wherein the at least one action of the microscopy measurement comprises image capturing of one or more further light-microscope images that image the multiplicity of cells.

EXAMPLE 26. Computer-implemented method according to example 24 or 25,
- wherein the at least one action comprises an analysis operation that is based on the estimation of the number and/or of the confluency, wherein the analysis operation is optionally selected from the following group: longitudinal analysis; total number estimation; cell cycle analysis; cell growth analysis.

EXAMPLE 27. Computer-implemented method according to any of the preceding examples, furthermore comprising:
- determining an estimation of the number of cells in a further light-microscope image,
- if the estimation of the number of cells lies below a predefined threshold value: Discarding the further light-microscope image,
- wherein the light-microscope image is acquired in reaction to the discarding of the further light-microscope image.

EXAMPLE 28. Computer-implemented method according to any of the preceding examples, furthermore comprising:
- selecting the light-microscope image from a multiplicity of light-microscope images having different contrasts.

EXAMPLE 29. Computer-implemented method according to any of the preceding examples,
wherein adapting the size of the light-microscope image (91, 92) and determining the estimation of the number and/or of the confluency of the cells are carried out by a single algorithm.

EXAMPLE 30. Device (101) comprising a processor (120) configured to carry out the following steps:
acquiring (3105) a light-microscope image (91, 92) which images a multiplicity of cells,
adapting (3110) a size of the light-microscope image (91, 92), such that a size of a predefined cell structure corresponds to a predefined reference value, and
after adapting (3110) the size: determining (3115, 3120) an estimation of the number and/or a confluency of the cells on the basis of the light-microscope image (91, 92).

EXAMPLE 31. Device (101) according to example 30, wherein the processor is configured to carry out the method according to example 1.

EXAMPLE 32. Device (101) comprising a processor (120) configured to carry out the following steps:
acquiring (3105) a light-microscope image (91, 92) which images a multiplicity of cells,
determining (3115, 3120) an estimation of the number of cells and an estimation of the confluency on the cells on the basis of the light-microscope image,
carrying out (3125) a cross-plausibilization of the estimation of the number of cells and the estimation of the confluency of the cells.

EXAMPLE 33. Device according to example 32, wherein the processor is configured to carry out the method according to example 14.

It goes without saying that the features of the embodiments and aspects of the invention described above can be combined with one another. In particular, the features can be used not only in the combinations described but also in other combinations or on their own without departing from the scope of the invention.

What is claimed is:

1. A method, comprising:
acquiring a light-microscope image which images a multiplicity of cells,
adapting a size of the light-microscope image, such that a size of a predefined cell structure of the multiplicity of cells corresponds to a predefined reference value,
after adapting the size: determining an estimation of at least one of a number or a confluency of the cells on the basis of the light-microscope image, and
using a first machine-learned algorithm, which adapts the size of the light-microscope image by means of an image-to-image transformation on the basis of the light-microscope image.

2. The method as claimed in claim 1, furthermore comprising:
localizing the cell structure in the light-microscope image,
on the basis of said localizing, determining an average size of the cell structure in the light-microscope image, and
determining a scaling factor for adapting the size on the basis of a ratio of the average size and the predefined reference value.

3. The method as claimed in claim 2,
wherein localizing the cell structure and determining the average size are carried out for a plurality of image excerpts of the light-microscope image and the average size is determined on the basis of an averaging in relation to the plurality of image excerpts for the light-microscope image.

4. The method as claimed in claim 1, furthermore comprising:
carrying out a plausibilization of a scaling factor associated with adapting the size of the light-microscope image.

5. The method as claimed in claim 1,
wherein adapting the size of the light-microscope image is carried out in a plurality of iterations,
wherein adapting the size of the light-microscope image is effected in the plurality of iterations until a plausibilization of a scaling factor associated with adapting the size of the light-microscope image is successful.

6. The method as claimed in claim 1,
wherein the multiplicity of cells has a plurality of cell types having different sizes,
wherein adapting the size of the light-microscope image furthermore comprises:
for each cell type: determining an associated instance of the light-microscope image and adapting the size of the respective instance of the light-microscope image, such that the size of the predefined cell structure for the respective cell type corresponds to the predefined reference value, whereby a respective rescaled instance of the light-microscope image is acquired,
wherein determining the estimation of the number and/or the confluency of the cells is carried out on the basis of the rescaled instances of the light-microscope image.

7. The method as claimed in claim 6, wherein the method furthermore comprises:
the instances in each case correspond to partitions of the light-microscopic image in which a corresponding cell type is dominant.

8. The method as claimed in claim 1, wherein the method furthermore comprises:
optionally activating the estimation of the number of cells and/or the estimation of the confluency of the cells on the basis of at least one from an operating mode of an imaging device that captures the light-microscope image, or an imaging modality of the light-microscope image.

9. The method as claimed in claim 1, wherein the method furthermore comprises:
optionally initiating at least one action of a microscopy measurement depending on the estimation of the number and/or of the confluency of the cells,
wherein the at least one action comprises an analysis operation that is based on the estimation of the number and/or of the confluency, wherein the analysis operation is optionally selected from the following group: longitudinal analysis; total number estimation;
cell cycle analysis; cell growth analysis.

10. The method as claimed in claim 1, which furthermore comprises:
determining an estimation of the number of cells in a further light-microscopic image,
if the estimation of the number of cells lies below a predefined threshold value: discarding the further light-microscopic image,
wherein the light-microscopic image is acquired in reaction to the discarding of the further light-microscopic image.

11. The method as claimed in claim 1,
wherein the estimation both of the number of cells and of the confluency of the cells is determined,
wherein the estimation of the number of cells is determined using a first machine-learned processing path of at least one second machine-learned algorithm,
wherein the estimation of the confluency of the cells is determined using a second machine-learned processing path of the at least one second machine-learned algorithm,
wherein a training of the first machine-learned processing path of the at least one second machine-learned algorithm and of the second machine-learned processing path of the at least one second machine-learned algorithm is based on a loss function which penalizes a variance of a position space density of cells within confluence regions.

12. A device comprising a processor configured to carry out the steps of claim 1.

13. A method, comprising:
acquiring a light-microscope image which images a multiplicity of cells,
adapting a size of the light-microscope image, such that a size of a predefined cell structure of the multiplicity of cells corresponds to a predefined reference value,
after adapting the size: determining an estimation of at least one of a number or a confluency of the cells on the basis of the light-microscope image, and
using a first machine-learned algorithm, which determines a scaling factor for adapting the size by means of an image-to-scalar transformation on the basis of the light-microscope image.

14. The method as claimed in claim 13,
wherein the first machine-learned algorithm acquires a plurality of image excerpts of the light-microscope image and wherein the scaling factor is determined on the basis of an averaging in relation to the plurality of image excerpts for the light-microscope image.

15. A device comprising a processor configured to carry out the steps of claim 13.

16. A method, comprising:
acquiring a light-microscope image which images a multiplicity of cells,
adapting a size of the light-microscope image, such that a size of a predefined cell structure of the multiplicity of cells corresponds to a predefined reference value, and
after adapting the size: determining an estimation of at least one of a number or a confluency of the cells on the basis of the light-microscope image, and
wherein the estimation both of the number of cells and of the confluency of the cells is determined,
wherein the estimation of the number of cells is determined using a first machine-learned processing path of at least one second machine-learned algorithm,
wherein the estimation of the confluency of the cells is determined using a second machine-learned processing path of the at least one second machine-learned algorithm, and
wherein a training of the first machine-learned processing path of the at least one second machine-learned algorithm and of the second machine-learned processing path of the at least one second machine-learned algorithm is based on a loss function which penalizes an absence of cells in a confluence region and/or which rewards a presence of a cell in a confluence region.

17. A device comprising a processor configured to carry out the steps of claim 16.

18. A method, comprising:
acquiring a light-microscope image which images a multiplicity of cells,
determining an estimation of the number of cells and an estimation of the confluency of the cells on the basis of the light-microscope image,
carrying out a cross-plausibilization of the estimation of the number of cells and the estimation of the confluency of the cells,
wherein the estimation of the number of cells is determined using a second machine-learned algorithm, and
wherein the second machine-learned algorithm provides a density map on the basis of the light-microscopic image, wherein the density map encodes a probability for the presence or absence of cells, wherein the number of cells is determined on the basis of the density map.

19. The method as claimed in claim 18,
wherein the cross-plausibilization comprises at least one from a check as to whether a cell is in each case arranged in a confluence region or a determination of an absolute value and/or a variance of a position space density of cells within confluence regions.

20. A device comprising a processor configured to carry out the steps of claim 18.

21. A method, comprising:
acquiring a light-microscope image which images a multiplicity of cells,
determining an estimation of the number of cells and an estimation of the confluency of the cells on the basis of the light-microscope image,
carrying out a cross-plausibilization of the estimation of the number of cells and the estimation of the confluency of the cells,
wherein the estimation of the confluency of the cells is determined using a second machine-learned algorithm, and
wherein the second machine-learned algorithm provides a confluence map on the basis of the light-microscopic image, wherein the confluence map masks confluence regions, wherein the confluency is determined on the basis of the confluence map.

22. A device comprising a processor configured to carry out the steps of claim 21.

* * * * *